United States Patent
Edwin et al.

(10) Patent No.: US 12,513,280 B1
(45) Date of Patent: Dec. 30, 2025

(54) PERCEPTUAL MEASURE OF END-TO-END SPLAY

(71) Applicant: Apple Inc., Cupertino, CA (US)

(72) Inventors: Lionel E Edwin, Hollywood, FL (US); William W Sprague, San Francisco, CA (US); Luke A Pillans, San Diego, CA (US); Thomas R Matzinger, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 18/468,212

(22) Filed: Sep. 15, 2023

Related U.S. Application Data

(60) Provisional application No. 63/376,741, filed on Sep. 22, 2022.

(51) Int. Cl.
*H04N 13/327* (2018.01)
*H04N 13/337* (2018.01)
*H04N 13/344* (2018.01)

(52) U.S. Cl.
CPC ......... *H04N 13/327* (2018.05); *H04N 13/337* (2018.05); *H04N 13/344* (2018.05)

(58) Field of Classification Search
CPC ... H04N 13/327; H04N 13/337; H04N 13/344
See application file for complete search history.

(56) References Cited

U.S. PATENT DOCUMENTS

| | | | | |
|---|---|---|---|---|
| 5,189,560 A | * | 2/1993 | Edwards | F41G 1/38 359/744 |
| 7,110,103 B2 | * | 9/2006 | Montgomery | G01C 11/06 356/152.1 |
| 7,538,876 B2 | | 5/2009 | Hewitt et al. | |
| 8,179,425 B2 | * | 5/2012 | Harrold | H04N 13/359 348/42 |
| 8,279,267 B2 | * | 10/2012 | Chen | H04N 23/6812 396/324 |
| 8,427,527 B2 | * | 4/2013 | Visser | A61B 1/00194 348/42 |
| 8,668,334 B2 | * | 3/2014 | Krenik | A61H 23/02 348/45 |
| 8,764,196 B2 | * | 7/2014 | Redmann | H04N 13/327 353/121 |
| 9,049,437 B2 | * | 6/2015 | Huang | H04N 9/3158 |
| 9,089,257 B2 | | 7/2015 | Hofeldt | |
| 9,454,010 B1 | * | 9/2016 | Passmore | G02B 3/0087 |
| 9,977,154 B2 | * | 5/2018 | Hofeldt | B29C 59/046 |

(Continued)

*Primary Examiner* — Irfan Habib
(74) *Attorney, Agent, or Firm* — Alexander A. Knapp; Kowert, Hood, Munyon, Rankin & Goetzel, P.C.

(57) ABSTRACT

A scene depicted using a binocular display device may be mis-calibrated in the vertical axis and generate vertical alignment error. A free-fusion state inducing scene may be first displayed that presents a user of the device with a contrasting scene that allows the user to recognize effects of vertical alignment error. Once accustomed to the free-fusion inducing scene, a vertical alignment error measurement scene may be displayed to the user to determine the vertical alignment error generated due to the miscalibration of the device. Based on the observed vertical alignment error, user input may be obtained to align the two patterns. A correction factor may be determined based on the user input and the device may be calibrated based on the correction factor.

20 Claims, 13 Drawing Sheets

(56) References Cited

U.S. PATENT DOCUMENTS

| | | | | |
|---|---|---|---|---|
| 10,212,414 | B2* | 2/2019 | Juenger | H04N 13/327 |
| 10,345,501 | B2* | 7/2019 | Schrader | G02B 5/20 |
| 10,366,521 | B1* | 7/2019 | Peacock | G02B 27/017 |
| 10,475,254 | B2* | 11/2019 | Dearman | G06F 3/0383 |
| 10,567,641 | B1* | 2/2020 | Rueckner | H04N 23/62 |
| 10,805,600 | B2* | 10/2020 | Keesling | H04N 13/194 |
| 10,890,751 | B2* | 1/2021 | Huang | G06F 3/011 |
| 11,223,820 | B2* | 1/2022 | Danziger | H04N 13/239 |
| 11,323,686 | B2 | 5/2022 | Sheridan | |
| 11,422,620 | B2 | 8/2022 | Vlaskamp | |
| 11,835,726 | B2* | 12/2023 | Ma | G02B 27/0093 |
| 11,961,258 | B2* | 4/2024 | Ma | G06T 7/70 |
| 12,039,642 | B2* | 7/2024 | Keller | H04N 23/67 |
| 12,079,903 | B1* | 9/2024 | Rivas Vetencourt | G06T 11/00 |
| 12,141,940 | B2* | 11/2024 | Ardö | G06T 3/4038 |
| 2013/0088579 | A1* | 4/2013 | Huh | H04N 13/246 |
| | | | | 348/47 |
| 2018/0249151 | A1* | 8/2018 | Freeman | G16H 40/63 |
| 2018/0267605 | A1* | 9/2018 | Border | G06V 30/1423 |
| 2019/0130622 | A1* | 5/2019 | Hoover | G06F 3/012 |
| 2019/0208187 | A1* | 7/2019 | Danziger | H04N 13/344 |
| 2020/0327867 | A1* | 10/2020 | Wang | G09G 3/001 |
| 2020/0396439 | A1* | 12/2020 | Stafford | G09G 3/3208 |
| 2021/0099691 | A1* | 4/2021 | Danziger | H04N 13/344 |
| 2023/0273433 | A1* | 8/2023 | Terrell, Jr. | H04N 13/344 |
| | | | | 359/630 |
| 2023/0273444 | A1* | 8/2023 | Demaster-Smith | G02B 27/0093 |
| | | | | 349/11 |
| 2023/0360290 | A1* | 11/2023 | Keller | G06T 3/40 |
| 2024/0171726 | A1* | 5/2024 | Hernandez | H04N 13/366 |
| 2024/0319504 | A1* | 9/2024 | Porubanova | H04N 13/383 |
| 2024/0333906 | A1* | 10/2024 | Porubanova | H04N 13/344 |
| 2024/0369861 | A1* | 11/2024 | Le | G02B 27/283 |
| 2024/0402494 | A1* | 12/2024 | Koppetz | H04N 23/90 |
| 2025/0130431 | A1* | 4/2025 | Adema | G02B 27/0172 |

\* cited by examiner

Display the vertical alignment measurement scene in an external display at a fixed distance away from a user of the device depicting a first time-based feature that is able to be observed by the left eye of the user and is filtered out by a right image filter at a first moment in time.
1202

Display, at a second moment in time subsequent to the first moment in time, the vertical alignment measurement scene in the external display, a second time-based feature that is able to be observed by the right eye of the user and is filtered out by a left image filter at the second moment in time.
1204

Receive another user input indicating another adjustment to be applied to one or more of the first time-based feature or the second time-based feature to compensate for the vertical alignment error.
1206

Determine fixation disparity of the user based on the other adjustment applied to the vertical alignment error based on the adjustment applied to the one or more of the first time-based feature or the second time-based feature.
1208

Shift, based on the determined vertical alignment error and the fixation disparity, the scene as displayed in one or both of the left display and the right display to reduce the vertical alignment error.
1210 to block 1100
of FIG. 11

FIG. 12

PERCEPTUAL MEASURE OF END-TO-END SPLAY

PRIORITY DATA

This application claims benefit of priority to U.S. Provisional Application Ser. No. 63/376,741, entitled "Perceptual Measure of End-to-End Splay", filed Sep. 22, 2022, and which is incorporated herein by reference in its entirety.

BACKGROUND

Discussion of Background

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for measuring and correcting splay errors (e.g., vertical alignment errors) in binocular displays in a device or system are described. A device may include a left display and a right display that display a scene in different perspectives and are combined in a process called binocular fusion to perceive a single image. Binocular fusion may be a process, or sets of processes, through which information from two eyes are combined to yield a single vision. For example, a person may naturally perform binocular fusion in their mind when viewing a scene through both eyes via a display or a set of displays. However, if the imagery on the right side of the display, or set of displays, (that is perceived in the right eye) and the left side of the display, or set of displays, (that is perceived in the left eye) are not matched, especially in the vertical direction the misalignment may cause a vertical binocular mismatch error or vertical alignment error (e.g., splay error). The vertical alignment error may cause discomfort for the viewer, as the vertical alignment error may particularly, in a yaw direction, strain the eyes. In environments where a scene is not received directly by the human eye from a defined 3D point of the object, but rather is mediated by one or more displays, filters, and/or cameras of a device, one or more of these components of the device may be misaligned and introduce splay error. Misaligned visual stimulus having the splay error may strain the human eyes into moving differentially between respective eyes in the vertical direction to attempt to fuse the misaligned visual stimulus and may generate discomfort. In some embodiments, the visual stimulus may not be able to be fused and may result in double vision (diplopia).

In some embodiments, in order to measure and/or correct for splay errors (e.g., vertical alignment errors) in a binocular display or set of displays, a process is followed that causes a free-fusion state to be displayed. This may allow for measurement of a natural disparity in vertical gaze direction of a user's eyes. For example, some users may naturally have some misalignment in their eye gaze direction regardless of splay errors introduced via a display. In a next step, a vertical alignment error measurement scene may be displayed, wherein the vertical alignment error measurement scene comprises a second pattern comprising features impacted by a vertical alignment error (such as a horizontal line that appears broken when there is a vertical alignment mismatch between left and right displays, as an example). While, the vertical alignment error measurement scene is displayed, the user may provide user inputs indicating an adjustment that reduces the vertical alignment error. The vertical alignment error measurement scene being displayed may be adjusted in proportion to the user input.

For example, using the horizontal line example mentioned above, an initial vertical alignment error measurement scene may include a straight horizontal line displayed on a screen that is being viewed by a user wearing a device comprising a left and right display. The horizontal line may be displayed on the screen as a straight unbroken line, but may appear in the left and right display in a way such that a left portion of the horizontal line is higher or lower than a right portion of the horizontal line. This mis-match may be caused by miss-alignment of cameras used to perceive the screen, mismatch in alignment of the displays, or various other causes as discussed herein. The user may provide user input that causes a left portion of the line being displayed on the screen to move up or down relative to a right portion, such that the actual line being displayed is no longer a straight unbroken line, but is instead a vertically mismatched line. This vertical mismatch of the line being displayed on the screen may compensate for the vertical alignment error as perceived by the user. For example, the user may adjust the line being displayed on the screen until the line perceived via the display worn by the user is a straight unbroken line (while the actual line being displayed on the screen is vertically mismatched). The degree to which the displayed line displayed on the screen is adjusted up or down (e.g., the compensating mismatch) may be indicative of the vertical alignment error of the device and may be used to determine calibration parameters for adjusting the device to compensate for vertical alignment error.

BRIEF DESCRIPTION OF THE DRAWINGS

FIG. 12 is a flowchart of a method for determining fixation disparity of an example system of binocular displays to reduce the vertical alignment error, according to some embodiments.

Figure 1B:
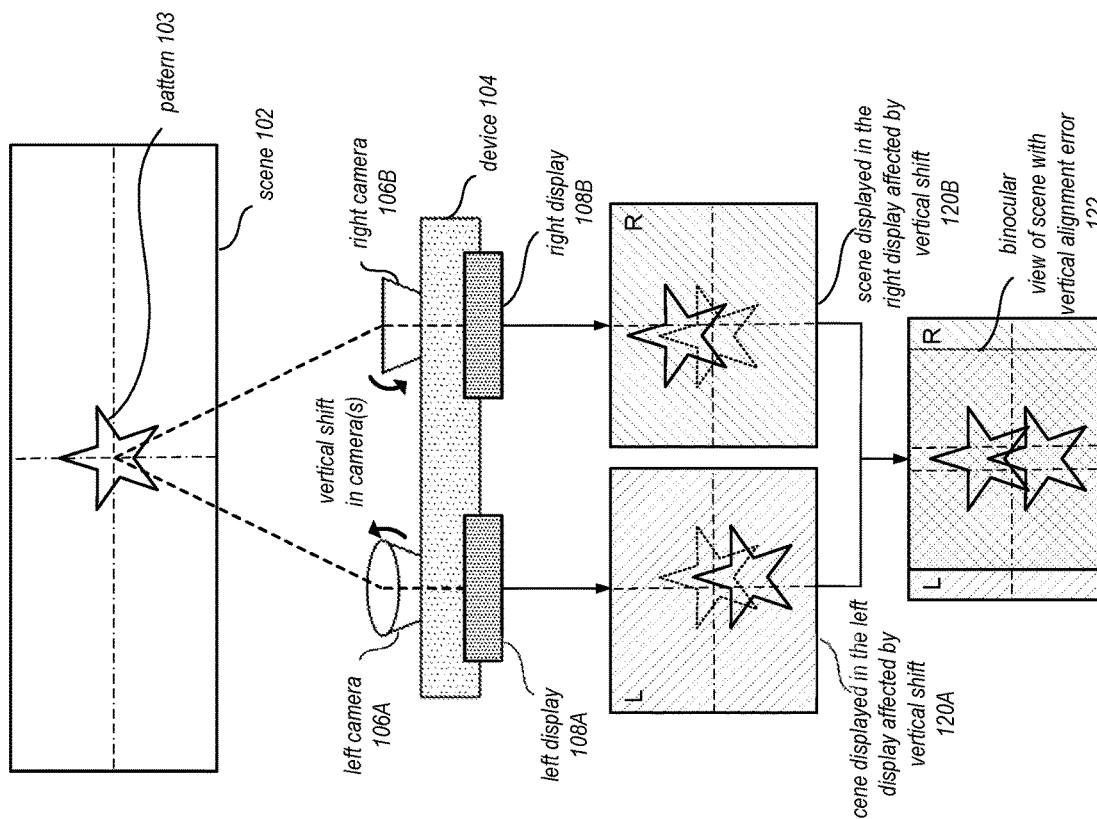
FIG. 1B illustrates an example system of binocular displays that is miscalibrated and depicts a scene in the binocular displays with a vertical alignment error, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 102, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for measuring and correcting vertical alignment errors in binocular displays in a device or systems are described. In some embodiments, a device may be used to obtain a left and a right perspective of a scene to generate a binocular view of a scene. In some embodiments, the binocular view of the scene may be fused correctly without vertical alignment error or fused incorrectly with a vertical alignment error based on one or more miscalibrated component of a device.

In some embodiments, in order to measure and/or correct for vertical alignment errors in a binocular display or set of displays, a process is followed that causes a free-fusion state to be displayed. This may allow for measurement of a natural disparity in vertical gaze direction of a user's eyes. For example, some users may naturally have some misalignment in their eye gaze direction regardless of vertical alignment errors introduced via a display. In a next step, a vertical alignment error measurement scene may be displayed, wherein the vertical alignment error measurement scene comprises a second pattern comprising features impacted by vertical alignment error (such as a horizontal line, as an example). While, the vertical alignment error measurement scene is displayed, the user may provide user inputs indicating an adjustment that reduces the vertical alignment error. The vertical alignment error measurement scene being displayed may be adjusted in proportion to the user input. An amount of user adjustment applied to compensate for the vertical alignment error may be used to calibrate the device to correct for the vertical alignment error.

Figure 1A:
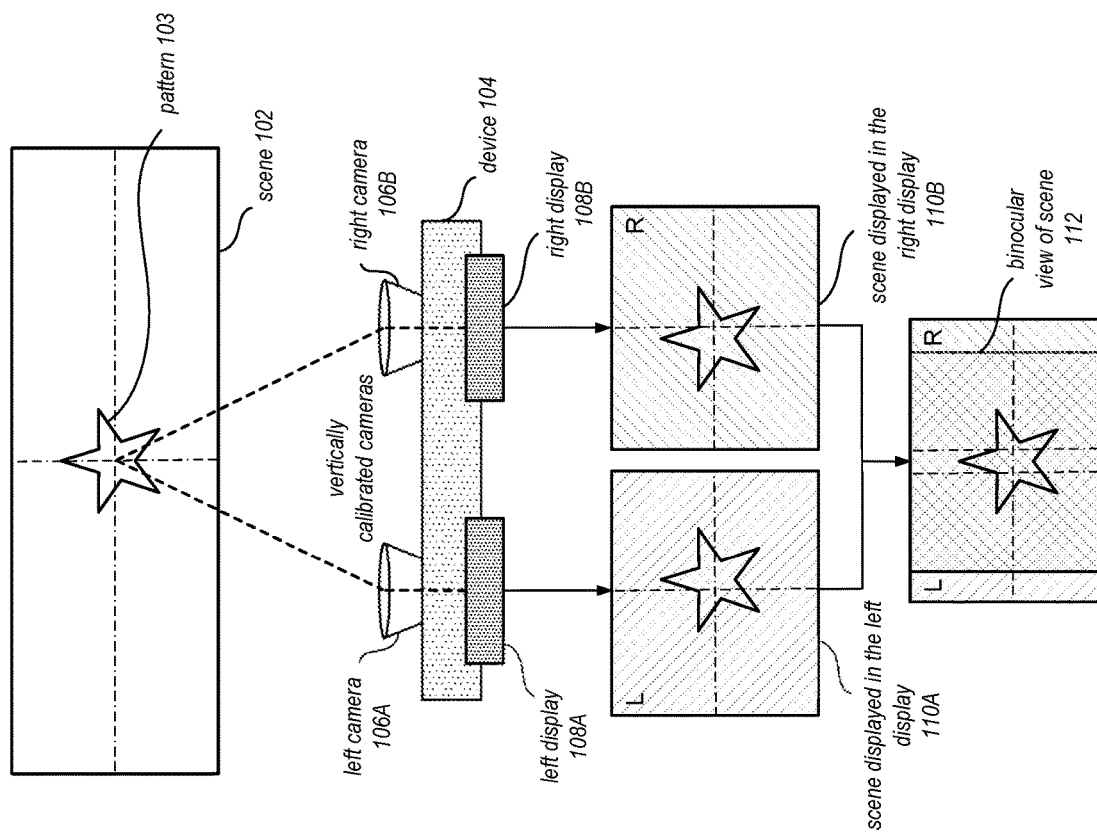
FIG. 1A illustrates an example system of binocular displays that depicts a scene in the binocular displays without a vertical alignment error, according to some embodiments.

For example, FIG. 1A illustrates an example system of binocular displays that depicts a scene in the binocular displays without a vertical alignment error, according to some embodiments. In some embodiments, a scene 102 may depict a pattern 103 to be shown stereoscopically to left and right displays of a set of binocular displays. In some embodiments, the scene 102 may by generated in an external display or monitor. In some embodiments, the external display may comprise portions that are polarized for respective ones of the left and right displays. In some embodiments, a device 104 may include the left camera 106A and a right camera 106B that captures a left and right perspective of the scene 102 and display the respective perspectives in a left display 108A and the right display 108B of the device 104. The device 104 (without vertical alignment error) may have been internally and/or extrinsically calibrated such that a scene displayed in the left display 110A and a scene displayed in the right display 110B may be combined into a binocular view of the scene 112 such that there is minimal or no vertical alignment error. For example, the left camera 106A, and the right camera 106B, and/or the left display 108A and the right display 108B may be vertically calibrated such that the pattern 103 of the scene 102 is displayed in the left display 108A and the right display 108B at the same or substantially similar vertical position.

The scene displayed on the left display 110A and the scene displayed in the right display 110B may display two different perspectives of the scene 102. The scene displayed in the left display 110A may have the pattern 103 shifted to the right and the scene displayed in the right display 110B may show that the pattern 103 is shifted to the left, but when viewed with respective left and right eyes, the result will be a binocular view of the scene 112 wherein the left and right display images (108A and 108B) of the scene 102 and the pattern 103 will undergo binocular fusion and be fused into a single, binocular view of the scene 112. In some embodiments, a certain amount of horizontal shift may be involved in generating the binocular view of the scene 112. However, as further discussed with regard to FIG. 1B, in some embodiments, a component of the device 104 may be miscalibrated such that the binocular view of the scene 112 contains vertical alignment error (e.g., vertical misalignment).

In some embodiments, it may be assumed that cameras 106A and 106B and displays 108A and 108B are mounted onto a rigid body of a given device (e.g., device 104 may be rigid). In some embodiments, cameras 106A and 106B and displays 108A and 108B may be mounted on a non-rigid body of a given device that is converted into a rigid arrangement when worn by a user. For example, an elastic band to which the components are attached may function as a rigid structure when tightly affixed to a user's body, such as the user's head. In such embodiments, cameras 106A and 106B and displays 108A and 108B may be viewed as being coupled to a locally rigid support of a larger (non-rigid) device.

For example, FIG. 1B illustrates an example system of binocular displays that is miscalibrated and depicts a scene in the binocular displays with a vertical alignment error, according to some embodiments. Similar to FIG. 1A, a scene 102 depicting a pattern 103 may be displayed using a left display 108A and a right display 108B of a device 104. In some embodiments, the left camera 106A and/or the right camera 106B may be miscalibrated resulting in a vertical shift. In some embodiments, instead of a physical shift in the camera, the one or more other components of device 104, such as either one of left display 108A or right display 108B, an eye-tracking sensor, or an inertial measurement unit (IMU) may be miscalibrated such that the resulting image displayed is miscalibrated at least in part in the vertical direction. This vertical shift in camera(s) (or other components) may result in a scene being displayed in the left display that is affected by vertical shift 120A and/or scene displayed in the right display affected by vertical shift 120B. As previously described with regard to FIG. 1A, the scene 120A displayed in the left display 108A may show that the pattern 103 is shifted to the right and the scene 120B displayed in the right display may show that the pattern 103 is shifted to the left. But, when viewed with respective left and right eyes, the user may perceive the scene in a binocular view. However, unlike FIG. 1A that depicts the vertically calibrated cameras, the vertical shift in camera(s) may introduce vertical alignment error. In some embodiments, a binocular view of scene with the vertical alignment error 122 may result in diplopia due to the patterns 103 being unable to undergo binocular fusion, as illustrated by FIG. 1B. Although not illustrated in FIG. 1B, in some embodiments, the binocular view of the scene with the vertical alignment error 122 may be binocularly fused but may still be affected by vertical alignment error in that the misaligned view of the scene causes strain on the eyes by requiring the eyes to move differentially in the vertical direction in an attempt to fuse the misaligned visual stimulus and may generate discomfort to the user. The vertical alignment error due to the miscalibration in the device 104, whether the miscalibration is due to vertical shift in the left camera 106A and/or the right camera 106B, or a component of the device that shifts the scene displayed in the left display 108A and/or the right display 108B, may be corrected, in some embodiments.

Figure 2B:
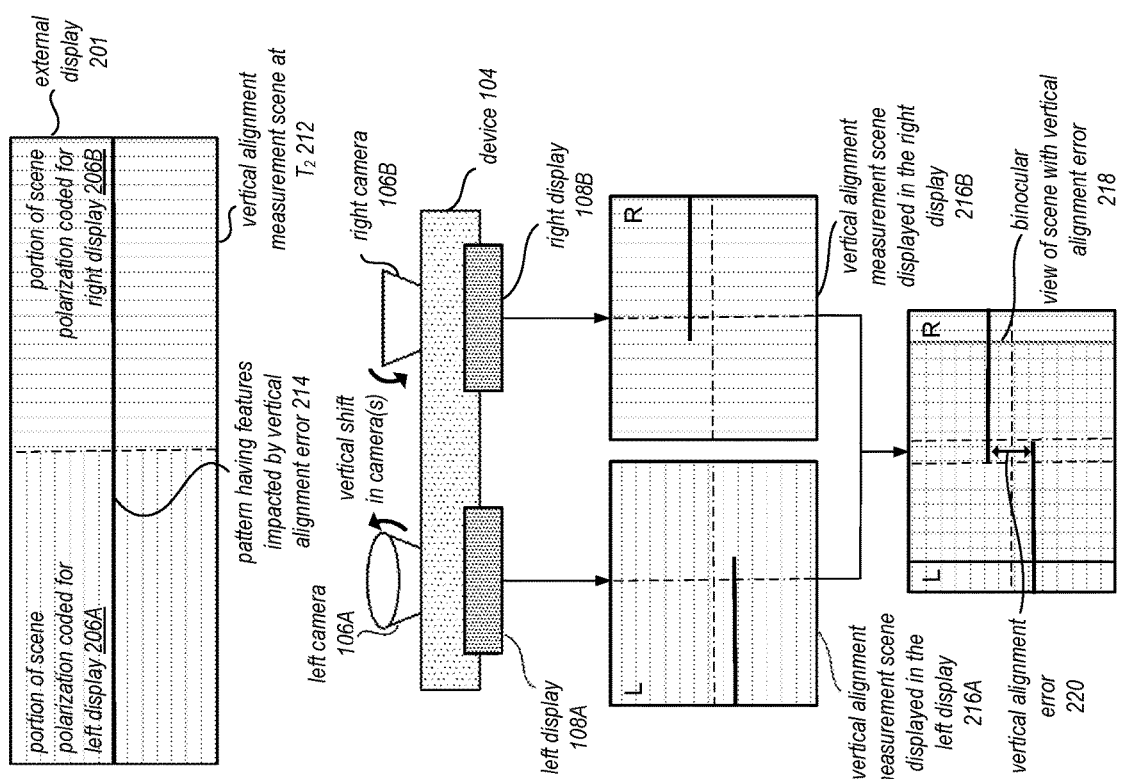
FIG. 2B illustrates an example system of binocular displays that depicts a vertical alignment error measurement scene that has been polarized for respective left and right displays and having a pattern comprising features impacted by a vertical alignment error, according to some embodiments.
Figure 2A:
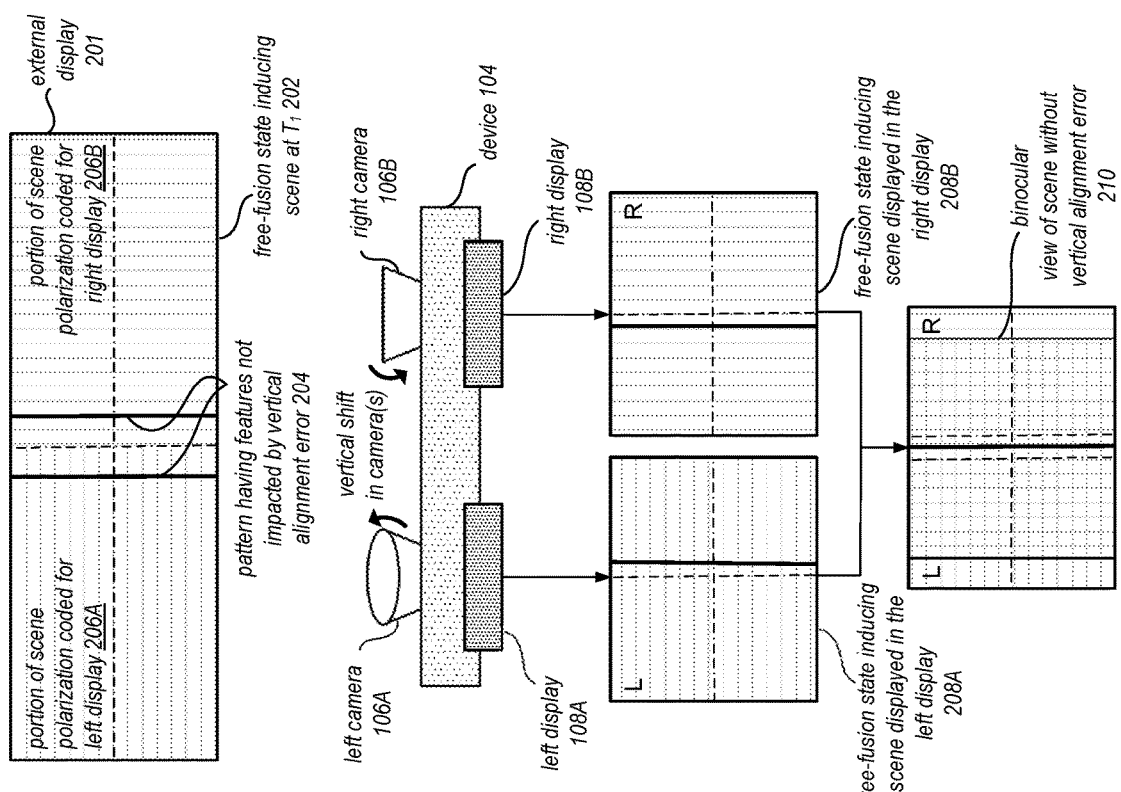
FIG. 2A illustrates an example system of binocular displays that depicts a free-fusion state inducing scene that has been polarized for respective left and right displays and having a pattern comprising features not impacted by a vertical alignment error, according to some embodiments.

FIG. 2A illustrates an example system of binocular displays that depicts a free-fusion state inducing scene that has been polarized for respective left and right displays and having a pattern comprising features not impacted by a vertical alignment error, according to some embodiments. In some embodiments, an external display 201 may display a free-fusion state inducing scene at a first moment in time ("$T_1$") 202. A free-fusion state may be a state in which the eyes of the wearer of a device 102 (e.g., user) are relaxed such that they will be able to recognize effects of vertical alignment error once having been accustomed to the free-fusion inducing scene. For example, the free fusion state inducing scene at $T_1$ 202 may contain a pattern having features that are not impacted by vertical alignment error 204 such that once accustomed, the user will recognize the discrepancy between the images of the left and right displays that are affected by vertical alignment error. In some embodiments, the free-fusion state inducing scene may be a scene comprising primarily vertical lines. In some embodiments, features that are impacted by vertical alignment errors may be features comprising primarily of horizontal lines (e.g., more horizontal lines than vertical lines). In some embodiments, features that are not impacted (or not impacted substantially) by vertical alignment errors may be features comprising primarily of vertical lines (e.g., more vertical lines than horizontal lines). In some embodiments, features that are not impacted by vertical alignment errors may be features comprising lines that are neither vertically nor horizontally aligned, such as lines oriented in a diagonal direction. The interplay between the free-fusion state inducing scene and vertical alignment error measurement scene will be further discussed in FIGS. 3A-3C. In some embodiments, the external display 201 may display a pattern of vertical lines that would not induce the human eyes into moving differentially in the vertical direction during binocular fusion. In some embodiments, the free-fusion state inducing scene at $T_1$ 202 may be a scene that causes free-fusion state in the user, such that the user is able to recognize effects of vertical alignment error, when transitioned to the vertical alignment error measurement scene. Instead of vertical lines as illustrated in FIG. 2A, the free-fusion state inducing scene at $T_1$ 202 may depict a binocular stimulus that may be binocularly fused and induces a free-fusion state in the user as discussed further in FIGS. 4-8.

In some embodiments, features may be selected for inclusion in the first scene as features that are not impacted by vertical alignment error based on the features having a property such that an amount of perceivable vertical offset with regard to a left portion of a given feature relative to a right portion of the given feature, when displayed in a system exhibiting vertical alignment errors, is less than a threshold amount of offset in the vertical direction. For example, a vertical line that runs from a bottom of a display to a top of a display will appear the same in both a left display portion and a right display portion, even if the left and right display portions have a specified (or greater) amount of vertical alignment error. In contrast, a purely horizontal line will have a perceivable vertical offset with regard to a left portion relative to a right portion that is proportional to the vertical alignment error being exhibited by the system. As yet another example, a 45-degree line may have a property such that the perceivable vertical offset with regard to a left portion relative to a right portion will be less than that of a purely horizontal line. For example, in some situations, the 45-degree line may have a property such that perceivable vertical offset when displayed in a system having a same amount of vertical alignment error (as the example system displaying the horizontal line) is approximately half that of the purely horizontal line. In some embodiments, a first scene (e.g., a free fusion state inducing scene) may simply be a solid design (e.g., a white screen, a black screen, a blue screen, etc.), in which case the solid design will not exhibit perceivable vertical offset even when displayed on a device or system exhibiting vertical alignment error (e.g., a specified or greater amount of vertical alignment error, when selecting features for inclusion in the first scene). In some embodiments, one or more features selected for inclusion in the first scene (e.g., free-fusion state inducing scene) may include a combination of lines, such as may be included in various shapes. However, the features may be selected such that the lines that make up the features have the property that they exhibit less than the threshold amount of perceivable vertical offset of a left portion relative to a right portion, when displayed in a device or system with a specified or greater amount of vertical alignment error.

In some embodiments, the external display 201 may display two separate vertical lines in a left portion of the external display 201 showing a portion of the scene that is polarization coded for left display 206A and a portion of the scene polarization coded for right display 206B. For example, FIG. 2A illustrates the portion of the scene that is polarization coded for left display 206A as having horizontal polarization and a portion of the scene polarization coded for right display 206B as having vertical polarization. In some embodiments, the polarization may be reversed with the polarization that is coded for the left display having a vertical polarization and the polarization that is coded for the right display having a horizontal polarization. The device 102 may include a left camera 106A modified to only capture the portion of the scene that is coded for the left display 206A and a right camera 106B modified to only capture the portion of the scene that is coded for the right display 206B. In some embodiments, the displays may utilize polarization decoders that selectively display the scene having a certain polarization such that the portion of the scene coded for left display 206A would be shown on the left display 108A and the portion of the scene coded for right display 206B would be shown on the right display 108B.

As illustrated in FIG. 2A, the respective portions of the free-fusion state inducing scene at $T_1$ 202 may be displayed in the left and right display according to the respective polarization. For example, the left display 108A may display a portion of the free-fusion state inducing scene displayed in the left display 208A and the right display 108A may display a free-fusion state inducing scene displayed in the right display 208A. In some embodiments, although the left camera 106A and/or the right camera 106B may be miscalibrated (e.g., having undergone a vertical shift), the vertical alignment error may not affect the scenes displayed due to the pattern having features not impacted by vertical alignment error 204. In some embodiments, instead of a physical shift in the camera, the one or more components of the device 102 may be miscalibrated such that the images shown on the respective left display 108A and the right display 108B would be shown shifted vertically if not for the external display 201 displaying the free-fusion state inducing scene. The free-fusion state inducing scene displayed in the left display 208A and the free-fusion state inducing scene displayed in the right display 208B may display two different perspectives (the scene displayed in the left display 208A may have the pattern shifted to the right and the scene displayed in the right display 208B may show that the pattern is shifted to at the left), but when viewed with respective left and right eyes result in a binocular view of the scene without vertical alignment error 210. The free-fusion state inducing scene displayed in the left display 208A and the free-fusion state inducing scene displayed in the right display 208B may undergo binocular fusion and be fused into a single, binocular view of the scene.

FIG. 2B illustrates an example system of binocular displays that depicts a vertical alignment error measurement scene that has been polarized for respective left and right displays and having a pattern comprising features impacted by a vertical alignment error, according to some embodiments. In some embodiments, as part of the calibration process to correct the left and/or right images shown on the respective left display 108A and right display 108B, the external display 201 may display a vertical alignment error measurement scene at a second moment in time ("$T_2$") 212. The vertical alignment error measurement scene may be a scene that includes features impacted by vertical alignment error introduced due to the vertical shift in cameras or other miscalibration of the device 104. In some embodiments, the vertical alignment error measurement scene at $T_2$ 212 may contain a pattern having features impacted by vertical alignment errors 214, such as a horizontal line as illustrated in FIG. 2B. The pattern having features impacted by vertical alignment errors 214 may be any pattern that is continuous in the horizontal direction across left-and-right sections such that vertical alignment errors will make the non-alignment of the features noticeable. For example, in some embodiments, the external display 201 may display two separate horizontal lines that are aligned and contiguous (appearing therefore as a single line). In some embodiments, the external display 201 may display the left portion of the external display 201 showing a portion of the scene that is polarization coded for the left display 206A and a portion of the scene polarization coded for the right display 206B, each respectively comprising portions of the horizontal line. Similar to FIG. 2A, the portion of the scene that is polarization coded for left display 206A may display the pattern that is horizontally polarized and the portion of the scene polarization coded for right display 206B may display the pattern that is vertically polarized. Furthermore, similar to FIG. 2A, the device 102 may include the left camera 106A modified to only capture the portion of the scene that is coded of the left display 206A and the right camera 106B modified to only capture the portion of the scene that is coded of the right display 206B. In some embodiments, the displays may utilize polarization decoders that selectively display the scene having a certain polarization such that the portion of the scene coded for left display 206A would be shown on the left display 108A and the portion of the scene coded for right display 206B would be shown on the right display 108B.

In some embodiments, the respective portions of the vertical alignment error measurement scene at $T_2$ 212 may be displayed in the left and right displays according to the respective polarization. For example, the left display 108A may display a portion of the vertical alignment error measurement scene displayed in the left display 216A and the right display 108B may display a portion of the vertical alignment error measurement scene displayed in the right display 216B. The vertical alignment error measurement scene(s) due to the miscalibration of the cameras and/or the components of the device may respectively display lines that have undergone a shift vertically such that a vertical alignment error measurement scene when viewed with respective left and right eyes result in a binocular view of a scene with vertical alignment error 218 having a vertical alignment error 220. The vertical alignment error 220 may be determined based on the mismatch in vertical position between the vertical alignment measurement pattern displayed in the left display 108A and the vertical alignment measurement pattern displayed in the right display 108B. In some embodiments, the free-fusion state inducing scene may be depicted for an extended time and the vertical alignment error measurement scene may be displayed intermittently to maintain diplopia that is able to make the vertical alignment error 220 visible. In some embodiments, the binocular view of the scene with vertical alignment error 218 may be binocularly fused such that the vertical alignment error 220 may not be distinguishable and may require the free-fusion state inducing scene to be displayed.

Figures 3A, 3B:
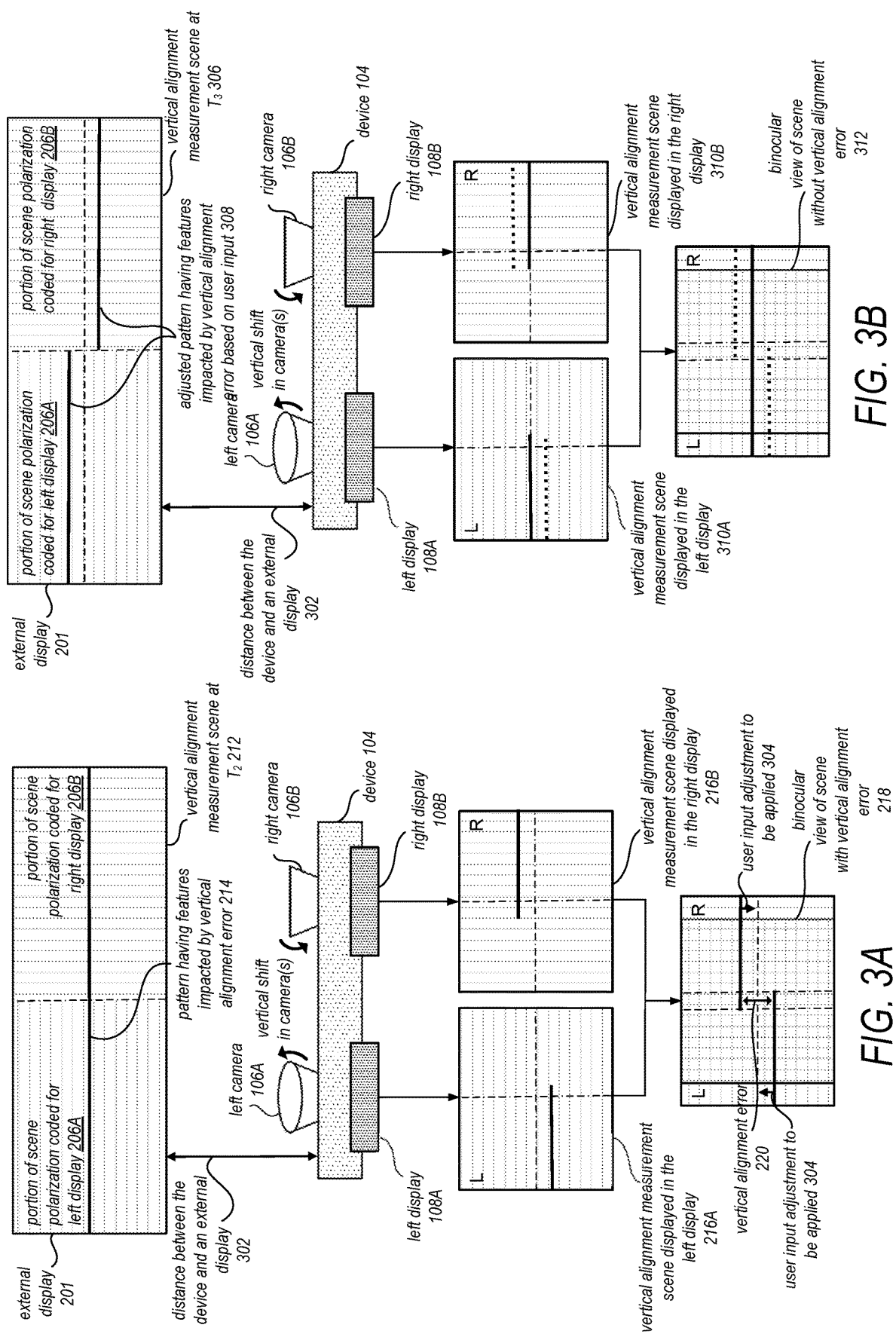
FIG. 3A illustrates an example system of binocular displays that depicts a vertical alignment error measurement scene that has been polarized for respective left and right displays and having a pattern comprising features impacted by a vertical alignment error and receiving a user input of adjustment to the scene to correct for a vertical alignment error, according to some embodiments.
FIG. 3B illustrates an example system of binocular displays that adjusts the vertical alignment error measurement scene in an external display that has been polarized for respective left and right displays based on the user input of adjustment to correct for the vertical alignment error, according to some embodiments.

FIG. 3A illustrates an example system of binocular displays that depicts a vertical alignment error measurement scene that has been polarized for respective left and right displays and having a pattern comprising features impacted by a vertical alignment error and receiving a user input of adjustment to the scene to correct for a vertical alignment error, according to some embodiments. As discussed in FIGS. 2A-2B, in some embodiments, as part of the calibration process to correct the left and/or right images shown on the respective left display 108A and right display 108B, the external display 201 may display a vertical alignment error measurement scene at $T_2$ 212 after displaying a free-fusion scene at $T_1$ 202 to enable the vertical alignment error 220 to be distinguishable in the binocular view of the scene with vertical alignment error 218. In some embodiments, based on the vertical alignment error 220 that is visible to the wearer of the device 104, a user input adjustment to be applied 304 may be applied to the pattern or the entire vertical alignment error measurement scene displayed in the left display 216A to correct for the vertical alignment error 220. Similarly, in some embodiments, based on the vertical alignment error 220, the user input adjustment to be applied 304 may be applied to the pattern or the entire vertical alignment error measurement scene displayed in the right display 216B to correct for the vertical alignment error 220.

In some embodiments, multiple iterations of the user adjustment to be applied 304 may be obtained and applied to the images shown in the left display 108A and/or the right display 108B. In some embodiments, the user adjustment to be applied 304 may be obtained during or after a repeated iteration of displaying the free-fusion scene and displaying the vertical alignment error measurement scene. In some embodiments, an adjustment factor may be determined based on the user input adjustment to be applied 304 to correct for the vertical alignment error and align the two lines. In some embodiments, a distance between the device and an external display 302 may optionally be used to determine the height (or pixels) to adjust the left portion of the scene and/or the right portion of the scene to be seen in the miscalibrated device 104, such that the adjusted scene appears aligned in the miscalibrated device 104. In such embodiments, the distance between the device 104 and the external display 302 may be obtained using various techniques and/or sensors of the device 104 including a light detection and ranging (LiDAR) sensor, a 3D laser scanner, a digital camera applying photogrammetry, etc. In some embodiments, based on the user input adjustment to be applied 304 that causes the left pattern to be shifted up and/or the right pattern to be shifted down, the portion of the scene polarization coded for the left display 206A and the right display 206B may similarly be shifted down proportionally based on the distance 302, such that the adjustment is based on both the distance 302 and the user input adjustment to be applied 304. In some embodiments, the distance 302 may be used to determine one or more ratios to which instances of the user adjustment to be applied 304 are to be multiplied in order to correct for the input in the left and right scenes taking into account a distance to the external display 201 displaying the vertical alignment error measurement scene. In some embodiments, measuring the vertical alignment error and applying the adjustment factor may be performed until a measured level of vertical alignment error is less than a threshold level of vertical alignment error. For example, the user may provide user input until the vertical alignment error is less than an amount of vertical alignment error perceptible by the user.

FIG. 3B illustrates an example system of binocular displays that adjusts the vertical alignment error measurement scene in an external display that has been polarized for respective left and right displays based on the user input of adjustment to correct for the vertical alignment error, according to some embodiments. In some embodiments, a vertical alignment error measurement scene at a third moment in time ("$T_3$") 306 may contain an adjusted pattern having features impacted by vertical alignment error based on user input 308. The adjustment may be based on one or more rounds of user input adjustments to be applied 304 as discussed in FIG. 3A. As illustrated in FIG. 3B, the respective portions of the vertical alignment error measurement scene at $T_3$ 306 may be displayed in the left and right displays according to the respective polarization. For example, the left display 108A may display a portion of the vertical alignment error measurement scene at $T_3$ 306 displayed in the left display 208A and the right display 108A may display a portion of the vertical alignment error measurement scene at $T_3$ 306 displayed in the right display 208A. However, although the cameras and/or components of the device 104 may be miscalibrated, for example having undergone a vertical shift, a vertical alignment error measurement scene displayed in the left display 310A, and a vertical alignment error measurement scene displayed in the right display 310B when viewed with respective left and right eyes may result in a binocular view of the scene without vertical alignment error 312 due to the adjustments performed based on an adjustment factor determined using the user inputs. In some embodiments, the binocular view of scene without vertical alignment error 312 may not be completely free of vertical alignment error (or effects thereof) but may be substantially free to a threshold level of vertical alignment error.

Figure 3C:
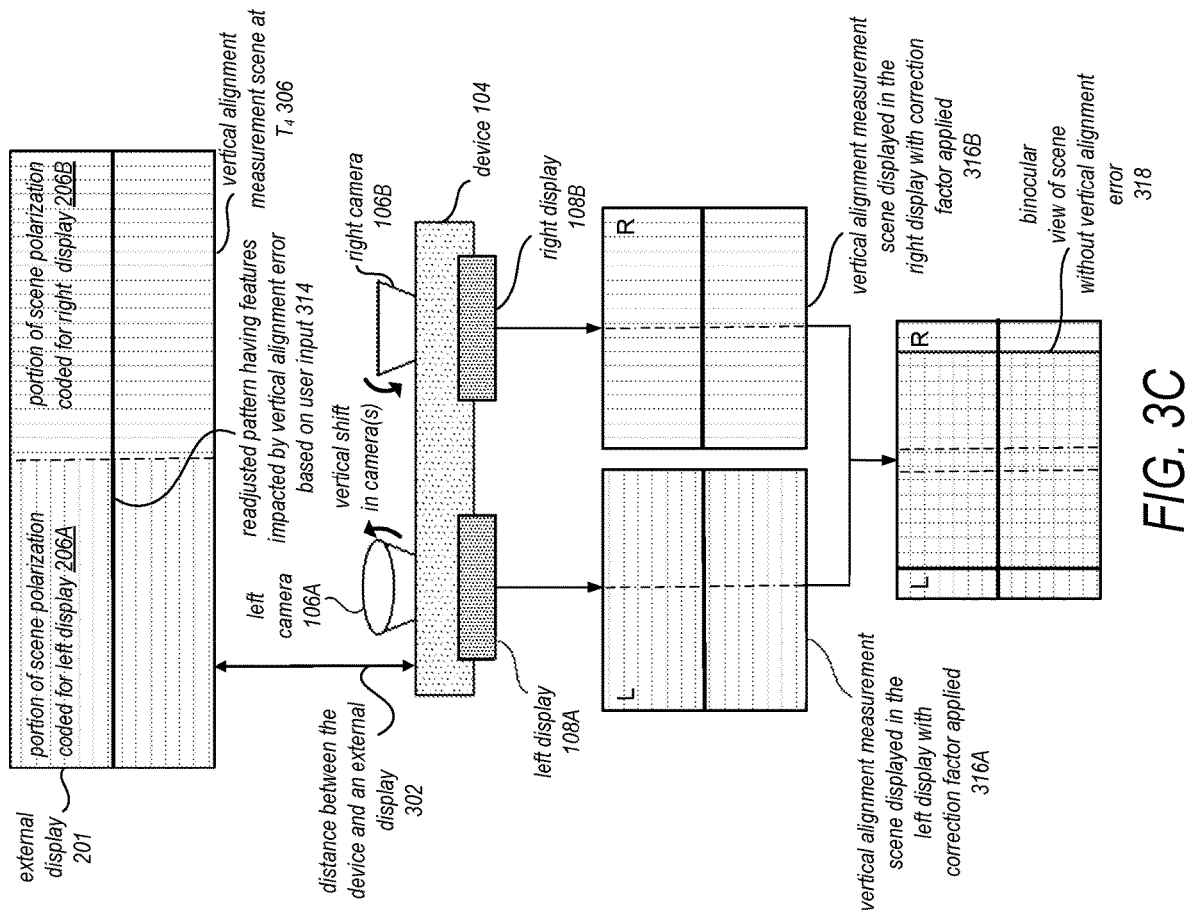
FIG. 3C illustrates an example system of binocular displays that applies a correction factor to a left display and/or a right display to correct for the vertical alignment error based on the user input for adjustment, according to some embodiments.

FIG. 3C illustrates an example system of binocular displays that applies a correction factor to a left display and/or a right display to correct for the vertical alignment error based on the user input of adjustment, according to some embodiments. In some embodiments, a vertical alignment error measurement scene at a fourth moment in time ("$T_4$") 306 may contain a readjusted pattern having features impacted by vertical alignment error based on user input 314. The readjusted pattern may be similar to the pattern 214 of the vertical alignment error measurement scene at $T_2$ 214. In some embodiments, the device 104 may be recalibrated according to a correction factor determined based on the user input received to correct for the vertical alignment error. For example, the correction factor may be applied to adjust the vertical positioning of the images displayed in the left display 108A and/or the right display 108B. Applying the correction factor to the device 104 corrects for the vertical shift in camera(s) (or other causes of vertical alignment error) such that a vertical alignment error measurement scene displayed in the left display with correction factor applied 316A and a vertical alignment error measurement scene displayed in the right display with correction factor applied 316B when viewed with respective left and right eyes result in a binocular view of the scene without vertical alignment error 318 (or with minimal vertical alignment error less than a threshold amount). In some embodiments, receiving the user adjustments, adjusting the pattern of the vertical alignment error measurement scene, readjusting the vertical alignment error measurement scene, and applying the correction factor may be repeated to calibrate the device 104. In some embodiments, the vertical alignment error measurement scenes displayed at various point in time may be separated by free-fusion scenes to enable a user to encourage diplopia and allow the vertical alignment error to be distinguished.

In some embodiments, the free-fusion scene and vertical alignment error measurement scene may take various forms. For example, instead of a free-fusion scene as illustrated in FIG. 2A which includes vertical lines, the free-fusion scene may depict a binocular stimulus that may be binocularly fused and, in the process, induce a free-fusion state in the user, such that the user is able to recognize effects of vertical alignment error. In some embodiments, instead of left and right portions of the scene being polarized and/or the display having horizontal/vertical polarizations, other variations of polarization may be applied, such as time multiplexed polarization. Multiple variations of vertical alignment error correction techniques will be discussed in FIGS. 4-7.

Figure 4:
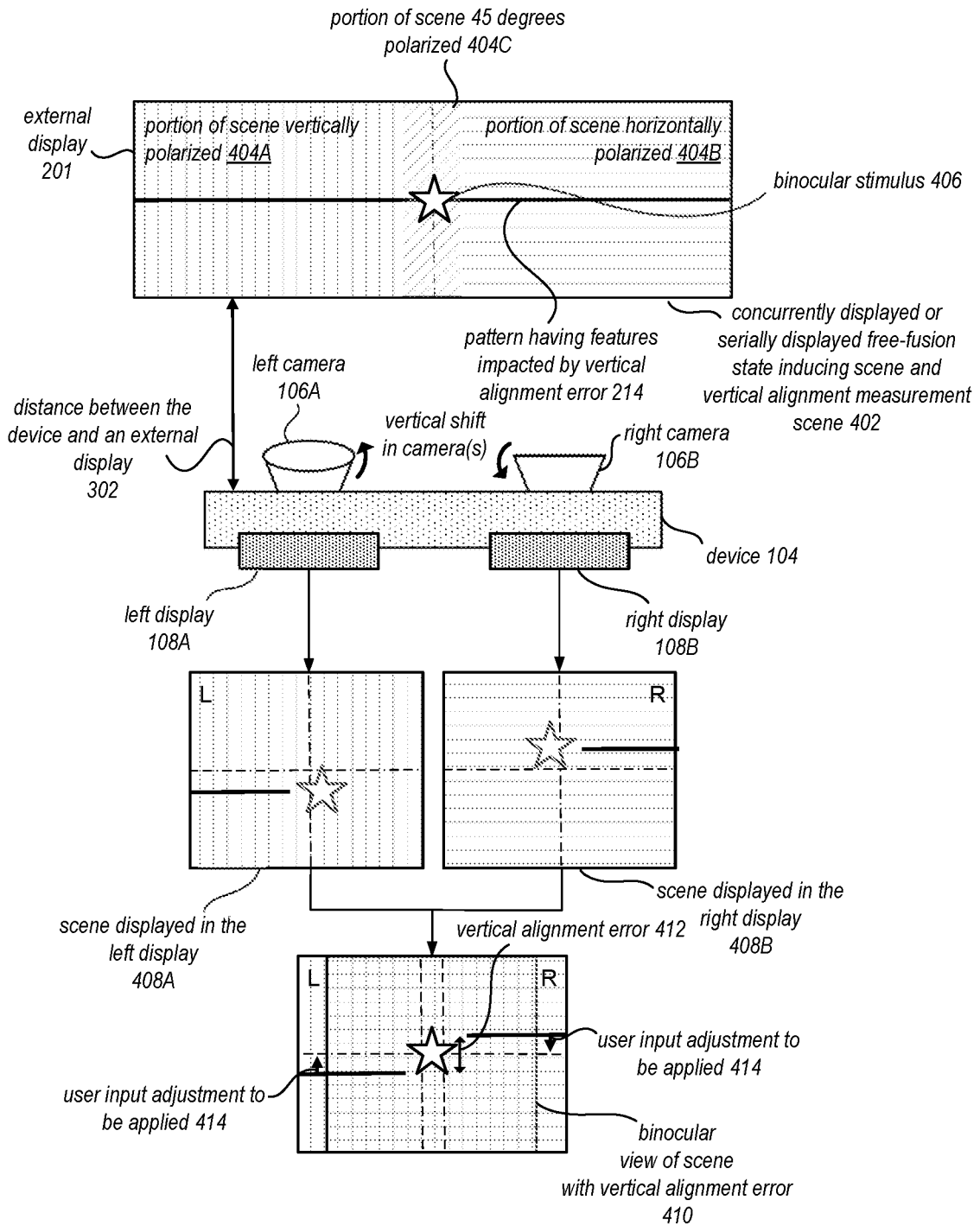
FIG. 4 illustrates an example system of binocular displays that depicts a free-fusion state inducing scene with a binocular stimulus and a vertical alignment error measurement scene with a pattern comprising features impacted by a vertical alignment error with a portion that has been diagonally polarized, according to some embodiments.

FIG. 4 illustrates an example system of binocular displays that depict a free-fusion state inducing scene with a binocular stimulus and a vertical alignment error measurement scene with a pattern comprising features impacted by a vertical alignment error with a portion that has been diagonally polarized, according to some embodiments. In some embodiments, an external display 201 may depict a concurrently displayed or serially displayed free-fusion state inducing scene and a vertical alignment error measurement scene 402 as illustrated in FIG. 4. The external display 201 may contain a portion of a scene that is vertically polarized 404A, horizontally polarized 404B, and 45 degrees polarized 404C. In some embodiments, the portion of the scene that is 45 degrees polarized (e.g., 404C) may be in the center between the vertically polarized and horizontally polarized portions. In some embodiments, instead of the left portion of the external display being vertically polarized and the right portion of the external display being horizontally polarized, the polarizations of the two portions of the external display may be switched. The free-fusion state inducing scene may be displayed serially wherein a binocular stimulus 406 may be included in the portion of the scene that is 45 degrees polarized 404C and may be displayed for a period of time, wherein it is subsequently replaced by a vertical alignment error measurement scene having a horizontal line (or other pattern affected by vertical alignment error as discussed in FIG. 2B), in some embodiments. In other embodiments, the free-fusion state inducing scene may be displayed concurrently with the vertical alignment error measurement scene wherein a binocular stimulus 406 may be shown for a period of time and afterwards the vertical alignment error measurement scene may be overlayed together with the free-fusion state inducing scene showing the binocular stimulus 406.

Similar to the device 102 as discussed with regard to FIG. 2A, the device 102 shown in FIG. 4 may include the left camera 106A modified to only capture a portion of the scene that is horizontally polarized 404B and the right camera 106B modified to only capture the portion of the scene that is vertically polarized 404A. In some embodiments, the left display 108A and the right display 108B, may be configured to depict only images having certain polarizations aside from horizontal and vertical. In some embodiments, the displays 108A and 108B may utilize polarization decoders that selectively display only respective ones of the portions of the scene having a certain polarization. Because the binocular stimulus 406 is 45 degrees polarized, the binocular stimulus 406 may appear on both of the displays 108A and 108B. For example, scene displayed in the left display 408A and scene displayed in the right display 408B may depict the binocular stimulus 406 that may be binocularly fused and induce a free-fusion state in the user. In some embodiments, the vertical alignment error measurement scene may be displayed to generate a vertical alignment error 412 and receive user input adjustments to be applied 414 to correct for the vertical alignment error 412. For example, a pattern having features impacted by vertical alignment errors 214 may be shown in the respective vertically and horizontally polarized portions of the scene. As part of the calibration process to correct the left and/or right images shown on the respective left display 108A and right display 108B, the external display 201 may display a vertical alignment error measurement scene after displaying the free-fusion scene to enable the vertical alignment error 412 to be distinguishable in the binocular view of the scene with vertical alignment error 410. In some embodiments, based on the vertical alignment error 412 that is visible to the wearer of the device 104 (e.g., a user), user input adjustment to be applied 414 may be obtained and a correction factor determined as discussed in FIGS. 3A-3C.

Figure 5:
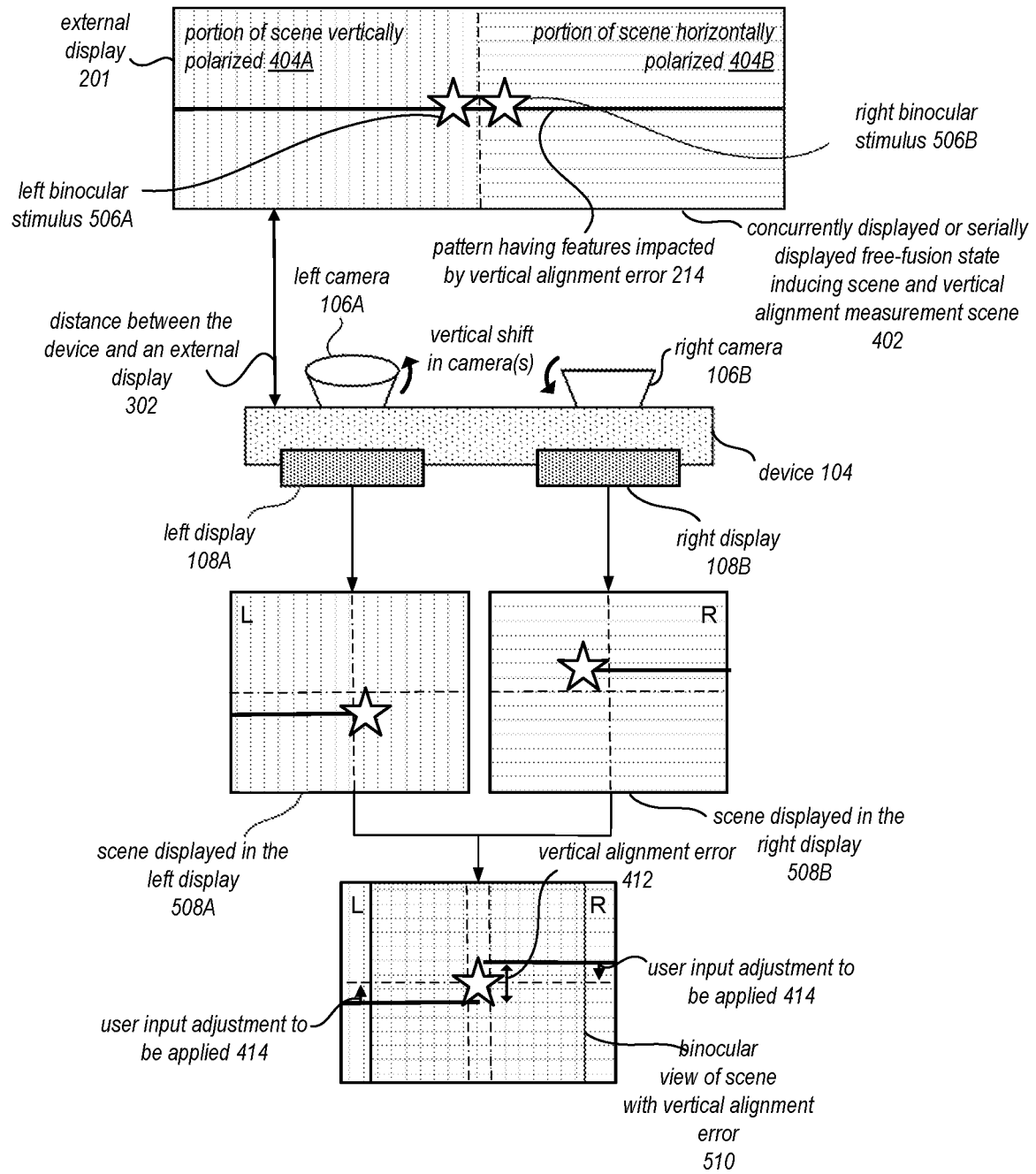
FIG. 5 illustrates an example system of binocular displays that depicts a free-fusion state inducing scene with a left and right binocular stimuli and a vertical alignment error measurement scene with a pattern comprising features impacted by a vertical alignment error that has been polarized for respective left and right displays, according to some embodiments.

FIG. 5 illustrates an example system of binocular displays that depicts a free-fusion state inducing scene with a left and right binocular stimuli and a vertical alignment error measurement scene with a pattern comprising features impacted by a vertical alignment error that has been polarized for respective left and right displays, according to some embodiments. In some embodiments, an external display 201 may depict a concurrently displayed or serially displayed free-fusion state inducing scene and a vertical alignment error measurement scene 402 as illustrated in FIG. 5. The external display 201 may display a portion of a scene that is vertically polarized 404A and a portion of the scene that is horizontally polarized 404B. In some embodiments, instead of the left portion of the external display being vertically polarized and the right portion being horizontally polarized, the polarizations of the two portions may be switched. As discussed in FIG. 4, the free-fusion state inducing scene may be displayed serially with respect to a vertical alignment error measurement scene such that a left binocular stimulus 506A and right binocular stimulus 506B may be displayed for a period of time and may be replaced by a vertical alignment error measurement scene having a horizontal line (or other pattern affected by vertical alignment error as discussed with regard to FIG. 2B). In other embodiments, the free-fusion state inducing scene may be displayed concurrently wherein the left and right binocular stimuli 506A and 506B may be shown for a period of time after which the vertical alignment error measurement scene may be overlayed together with the free-fusion state inducing scene showing the binocular stimuli.

In some embodiments, the device 102 may include the left camera 106A modified to only capture a portion of the scene that is horizontally polarized 404B and the right camera 106B modified to only capture the portion of the scene that is vertically polarized 404A. In some embodiments, the left display 108A and the right display 108B, may be configured to depict only images having certain polarizations. In some embodiments, the displays may utilize polarization decoders that selectively display only respective ones of the portions of the scene having a certain polarization. In some embodiments, the scene displayed in the left display 508A and scene displayed in the right display 508B may respectively depict the binocular stimuli 508A and 508B that may be binocularly fused and induce a free-fusion state in the user. In some embodiments, the vertical alignment error measurement scene may be displayed to generate a vertical alignment error 412 and receive user input adjustment to be applied 414 to correct for the vertical alignment error 412. For example, similar to as discussed above with regard to FIG. 4, a pattern having features impacted by vertical alignment errors 214 may be shown in the respective vertically and horizontally polarized portion of the scene 404A and 404B. As part of the calibration process to correct the left and/or right images shown on the respective left display 108A and right display 108B, the external display 201 may display a vertical alignment error measurement scene after displaying the free-fusion scene to enable the vertical alignment error 412 to be distinguishable in the binocular view of the scene with vertical alignment error 510. In some embodiments, based on the vertical alignment error 412 that is visible to the wearer of the device 104 (e.g., user), user input adjustment to be applied 414 may be obtained and a correction factor determined and applied to the device 104 as discussed in FIGS. 3A-3C.

Figure 6:
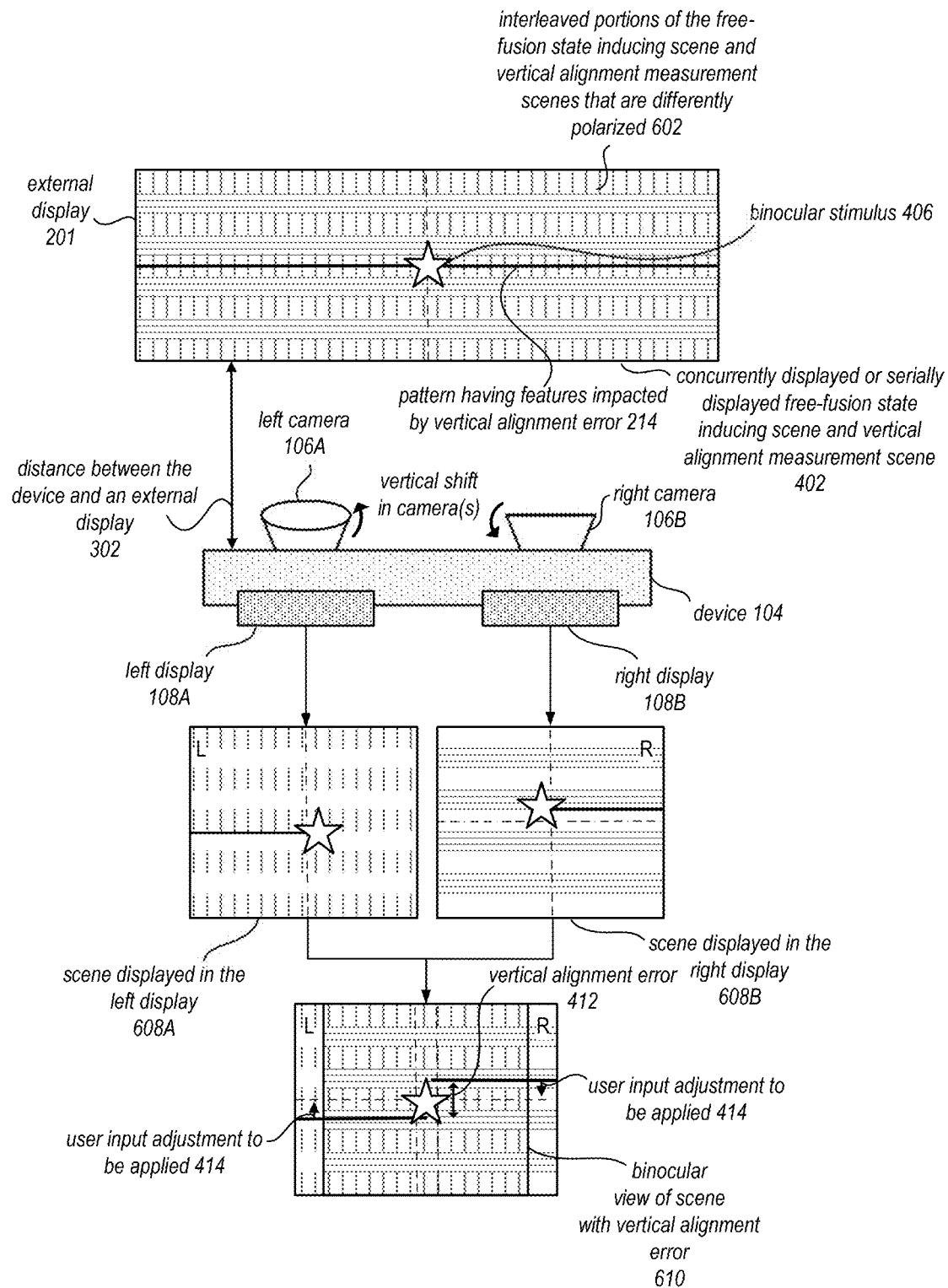
FIG. 6 illustrates an example system of binocular displays that depicts a free-fusion state inducing scene with a binocular stimuli and a vertical alignment error measurement scene with a pattern comprising features impacted by a vertical alignment error that has been polarized in a manner comprising multiple interleaved portions for respective left and right displays, according to some embodiments.

FIG. 6 illustrates an example system of binocular displays that depicts a free-fusion state inducing scene with a binocular stimuli and a vertical alignment error measurement scene with a pattern comprising features impacted by a vertical alignment error that have been polarized into a plurality of interleaved portions for respective left and right displays, according to some embodiments. In some embodiments, an external display 201 may depict a concurrently displayed or serially displayed free-fusion state inducing scene and a vertical alignment error measurement scene 402 having interleaved portions of the free-fusion state inducing scene and vertical alignment error measurement scenes that are differently polarized 602, as illustrated in FIG. 6. The external display 201 may contain such interleaved or multiplexed portions of the scene that are vertically polarized and horizontally polarized. In some embodiments, instead of the interleaved portions of the scene 402 being interleaved in horizontal layers, the portions of the scene 402 may be interleaved in vertical layers. As discussed in FIG. 4, the free-fusion state inducing scene may be displayed serially with respect to a vertical alignment error measurement scene such that the binocular stimulus 406 may be displayed for a period of time and may be replaced by a vertical alignment error measurement scene having a horizontal line (or other pattern affected by vertical alignment error discussed in FIG. 2B). In other embodiments, the free-fusion state inducing scene may be displayed concurrently with the vertical alignment error measurement scene wherein the binocular stimulus 406 may be shown for a period of time after which the vertical alignment error measurement scene may be overlayed together with the free-fusion state inducing scene showing the binocular stimulus.

In some embodiments, as discussed in FIG. 2A, the device 102 may include the left camera 106A modified to only capture a portion of the scene that is horizontally polarized and the right camera 106B modified to only capture a portion of the scene that is vertically polarized. The left display 108A and the right display 108B, may be configured to depict only images having certain polarizations aside from horizontal and vertical polarizations. In some embodiments, the displays may utilize polarization decoders that selectively display only respective ones of the portions of the scene having a certain polarization. In some embodiments, the scene displayed in the left display 608A and scene displayed in the right display 608B may respectively depict the binocular stimulus 406 that may be binocularly fused and induce a free-fusion state in the user. In some embodiments, the binocular stimulus 406 may be displayed using a separate display or configured to be registered in both left and right displays such that all portions of the stimulus are displayed in both the left and right displays. In some embodiments, the vertical alignment error measurement scene may be displayed to generate a vertical alignment error 412 and receive user input adjustment to be applied 414 to correct for the vertical alignment error 412. For example, similar to as discussed above with regard to FIG. 4, a pattern having features impacted by vertical alignment errors 214 may be shown in the respective vertically and horizontally polarized interleaved portions of the scene. As part of the calibration process to correct the left and/or right images shown on the respective left display 108A and right display 108B, the external display 201 may display a vertical alignment error measurement scene after displaying the free-fusion scene for a period of time to enable the vertical alignment error 412 to be distinguishable in the binocular view of the scene with vertical alignment error 610. In some embodiments, based on the vertical alignment error 412 that is visible to the wearer of the device 104 (e.g., user), user input adjustment to be applied 414 may be obtained and a correction factor determined and applied to the device 104 as discussed in FIGS. 3A-3C.

Figures 7A, 7B:
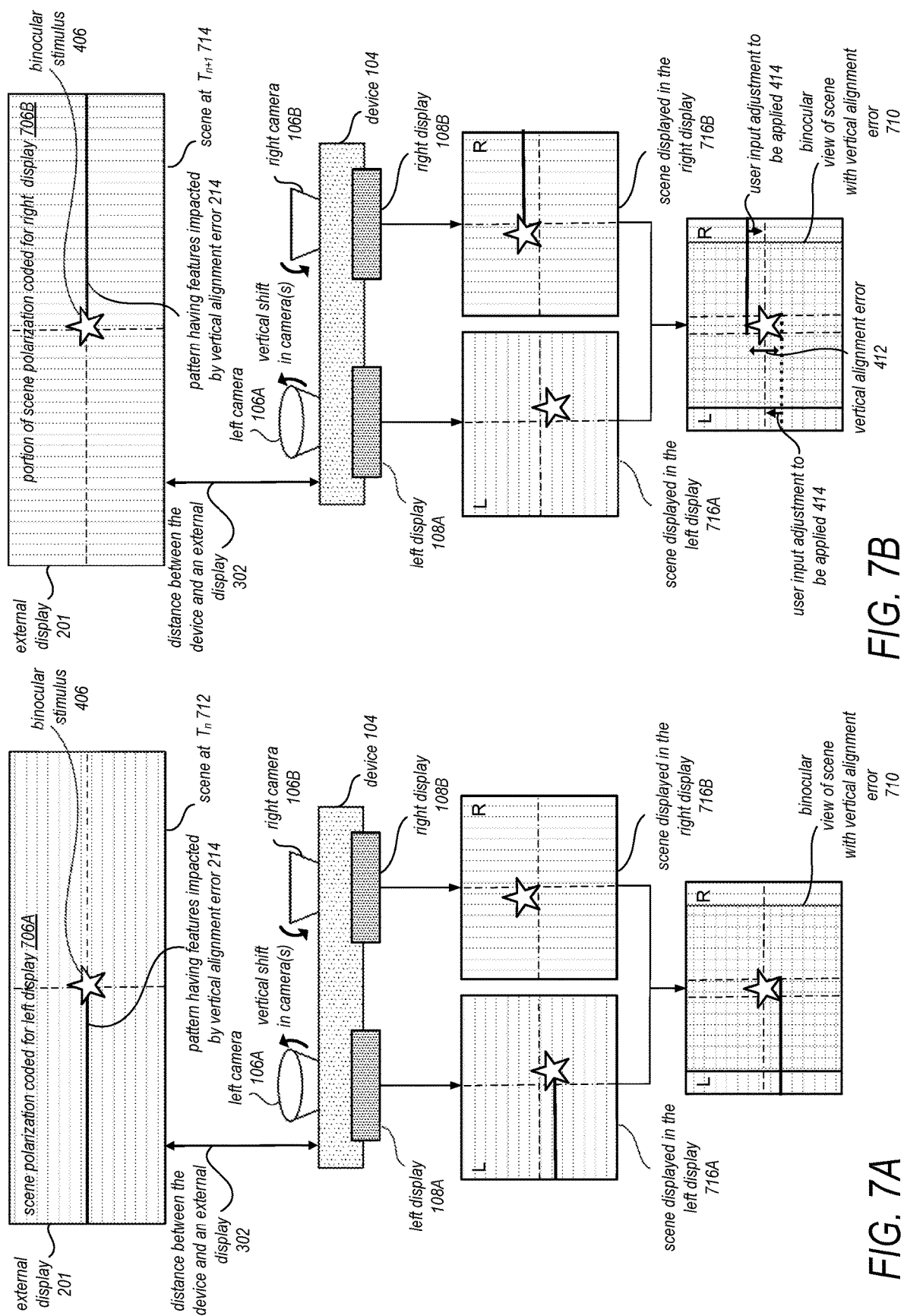
FIG. 7A illustrates an example system of binocular displays that depicts a free-fusion state inducing scene with a binocular stimuli and a vertical alignment error measurement scene with a pattern comprising features impacted by a vertical alignment error that has been polarized in a time multiplexed manner for a left display at a first moment in time, according to some embodiments.
FIG. 7B illustrates an example system of binocular displays that depicts a free-fusion state inducing scene with a binocular stimuli and a vertical alignment error measurement scene with a pattern comprising features impacted by a vertical alignment error that has been polarized in a time multiplexed manner for a right display at a second moment in time, according to some embodiments.

FIG. 7A illustrates an example system of binocular displays that depicts a free-fusion state inducing scene with a binocular stimuli and a vertical alignment error measurement scene with a pattern comprising features impacted by a vertical alignment error that has been polarized in a time multiplexed manner for a left display at a first moment in time, according to some embodiments. In some embodiments, an external display 201 may depict a scene at $T_n$ 712 that contains a scene polarization coded for the left display 706A. As discussed in FIG. 4, the free-fusion state inducing scene showing the binocular stimulus 406 may be displayed at $T_n$ serially with respect to a vertical alignment error measurement scene such that the binocular stimulus 406 may be displayed for a period of time and may be replaced by a vertical alignment error measurement scene having a horizontal line or may be displayed concurrently wherein the binocular stimulus 406 may be shown for a period of time after which the vertical alignment error measurement scene may be overlayed together with the free-fusion state inducing scene showing the binocular stimulus.

In some embodiments, as discussed in FIG. 2A, the device 102 may include the left camera 106A modified to only capture a portion of the scene that is horizontally polarized and the right camera 106B modified to only capture a portion of the scene that is vertically polarized. The left display 108A and the right display 108B, may be configured to depict only images having certain polarizations aside from horizontal and vertical polarizations. In some embodiments, the displays may utilize polarization decoders that selectively display only respective ones of the portions of the scene having a certain polarization. In some embodiments, the scene displayed in the left display 716A and scene displayed in the right display 716A may respectively depict the binocular stimulus 406 that may be binocularly fused and induce a free-fusion state in the user. In some embodiments, the binocular stimulus 406 may be displayed using a separate display or configured to be displayed using the external display such that it is registered in both left and right displays such that all portions of the stimulus are displayed in both the left and right displays. The scene displayed in the left display 716A may depict the pattern having features impacted by vertical alignment error 214 whereas the right display 716B may not, as at $T_n$ the scene is polarization coded to be shown in the left display.

FIG. 7B illustrates an example system of binocular displays that depicts a free-fusion state inducing scene with a binocular stimuli and a vertical alignment error measurement scene with a pattern comprising features impacted by a vertical alignment error that has been polarized in a time multiplexed manner for a right display at a second moment in time, according to some embodiments. In some embodiments, an external display 201 may depict a scene at $T_{n+1}$ 714 that comprises a scene polarization coded for the right display 706A. Similar to FIG. 7A, and as discussed in FIG. 4, the free-fusion state inducing scene showing the binocular stimulus 406 may be displayed at $T_{n+1}$ serially with respect to a vertical alignment error measurement scene such that the binocular stimulus 406 may be displayed for a period of time and may be replaced by a vertical alignment error measurement scene having a horizontal line or may be displayed concurrently wherein the binocular stimulus 406 may be shown for a period of time after which the vertical alignment error measurement scene may be overlayed together with the free-fusion state inducing scene showing the binocular stimulus. At $T_{n+1}$, the scene displayed in the right display 716B would depict the pattern having features impacted by vertical alignment error 214 whereas the left display 716A would not, as at $T_{n+1}$ the scene is polarization coded to be shown in the right display.

In some embodiments, by interleaving or multiplexing between the scene polarization coded for the left display 706A and the scene polarization coded for the right display 706B in a time-based manner, a vertical alignment error 412 may be distinguishable in the binocular view of the scene with vertical alignment error 710 to the wearer of the device 712 (e.g., user). In some embodiments, the rate at which the left and right polarization scenes are depicted may be rapid such that the visual memory of the scenes enables the vertical alignment error 412 to be discerned. In some embodiments, based on the vertical alignment error 412 that is visible to the wearer of the device 104 (e.g., user), user input adjustment to be applied 414 may be obtained and a correction factor determined and applied to the device 104 as discussed in FIGS. 3A-3C.

In some embodiments, the calibration discussed in FIGS. 1-7 may correct for the vertical alignment error without accounting for the naturally occurring phoria or misalignment of the eyes of the wearer. Because a wearer having naturally occurring phoria will be accustomed to their eyes having a residual vergence error, accounting for the fixation disparity in the correction factor applied to the device may result in greater comfort for the user.

Figures 8A, 8B:
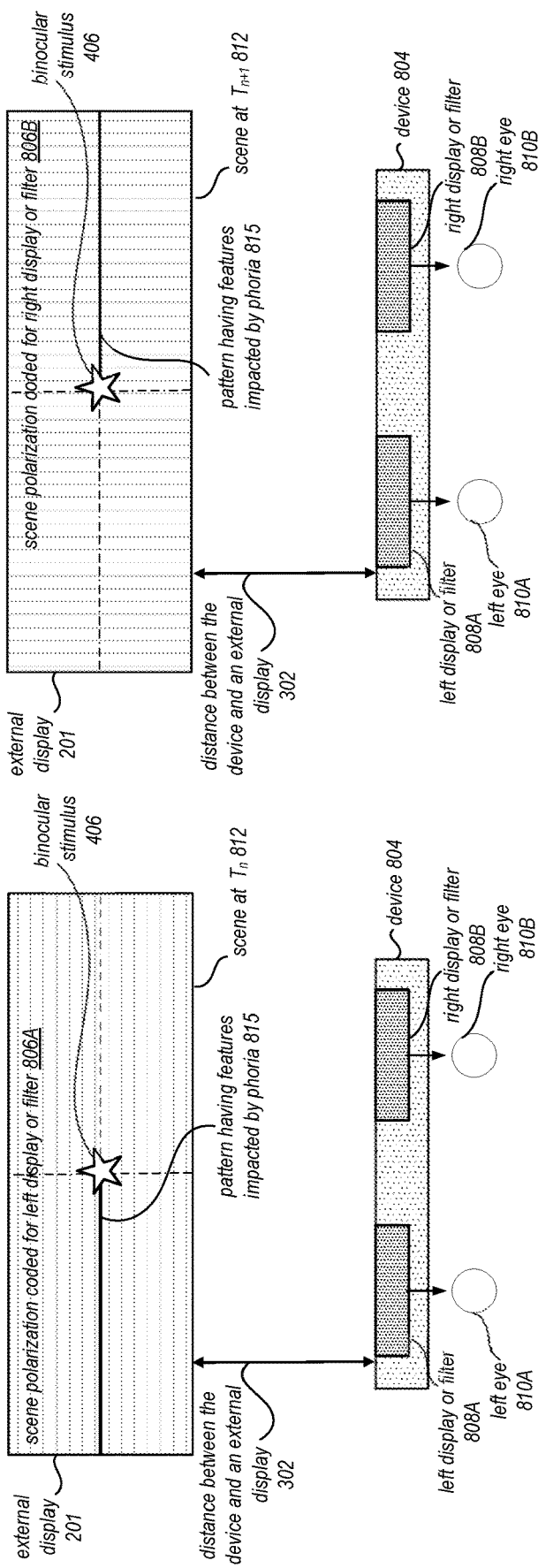
FIG. 8A illustrates an example system of binocular displays or filters coupled to a frame that depicts a free-fusion state inducing scene with a binocular stimuli and a vertical alignment error measurement scene with a pattern comprising features impacted by a vertical alignment error that has been horizontally polarized at a first moment in time to determine fixation disparity of a user, according to some embodiments.
FIG. 8B illustrates an example system of binocular displays or filters coupled to a frame that depicts a free-fusion state inducing scene with a binocular stimuli and a vertical alignment error measurement scene with a pattern comprising features impacted by a vertical alignment error that has been vertically polarized at a second moment in time to determine fixation disparity of a user, according to some embodiments.

FIG. 8A illustrates an example system of binocular displays or filters coupled to a frame that depicts a free-fusion state inducing scene with a binocular stimuli and a vertical alignment error measurement scene with a pattern comprising features impacted by a vertical alignment error that has been horizontally polarized at a first moment in time to determine fixation disparity of a user, according to some embodiments. In some embodiments, an external display 201 may depict a scene at $T_n$ 812 that contains a scene polarization coded for a left display or filter 806A of a device 104. In some embodiments, the device 804 may be the same device as described in FIGS. 1-7 or may be a different device wherein the scene at $T_n$ 812 may be viewed by a left eye 810A and a right eye 810B of the wearer without being affected by shifts in cameras or other components of the device 804. In some embodiments, the display or filter may be a polarization filter to allow only scenes that are polarization coded for the filter to be seen by the eyes. In some embodiments, the scene at $T_n$ 812 may display a binocular stimulus 406 that is displayed to both a left eye 810A and the right eye 810B of the wearer of the device 104 (e.g., user). The binocular stimulus 406 may be displayed to both eyes using various methods including using a separate display and/or configuring a polarization decoder of the device 104 to allow the binocular stimulus 406 to be displayed to both eyes. In some embodiments, a vertical alignment error measurement scene may be overlayed together with the free-fusion state inducing scene showing the binocular stimulus. The vertical alignment error measurement scene may depict a pattern having features impacted by vertical alignment error from phoria 815 that may be seen only in the left eye 810A via the left display or filter 808A.

FIG. 8B illustrates an example system of binocular displays or filters coupled to a frame that depicts a free-fusion state inducing scene with a binocular stimuli and a vertical alignment error measurement scene with a pattern comprising features impacted by a vertical alignment error that has been vertically polarized at a second moment in time to determine fixation disparity of a user, according to some embodiments. In some embodiments, the external display 201 may depict a scene at $T_{n+1}$ 814 that contains a scene polarization coded for a right display or filter 806B of the device 804. In some embodiments, the scene at $T_{n+1}$ 814 may display a binocular stimulus 406 that is displayed to both a left eye 810A and the right eye 810B of the wearer of the device 104. Similar to FIG. 8A, the binocular stimulus 406 may be displayed to both eyes. In some embodiments, a vertical alignment error measurement scene may be overlayed together with the free-fusion state inducing scene showing the binocular stimulus. The vertical alignment error measurement scene may depict at $T_{n+1}$ the pattern having features impacted by vertical alignment error from phoria 815 that may be seen only in the right eye 810A via the right display or filter 808A. By interleaving or multiplexing between the scene polarization coded for the left display or filter 806A and the scene polarization coded for the right display or filter 806B in a time-based manner, a misalignment of the pattern 214 caused by the fixation disparity of the wearer (e.g., user) may be distinguishable to the wearer (e.g., user). In some embodiments, the rate at which the left and right polarization scenes are depicted may be rapid such that the visual memory of the scenes enables the fixation disparity to be discerned. In some embodiments, based on the misalignment that is visible to the wearer of the device 804 (e.g., user), the wearer may control the pattern having features impacted by vertical alignment error from phoria 815 displayed in the scene to align the pattern. In some embodiments, the fixation disparity of the wearer may be determined based on the user input to align the pattern having features impacted by vertical alignment error from phoria 815 and the distance between the device and the external display 302. In some embodiments, the fixation disparity may be applied to the correction factor described in FIGS. 1-7, to account for the naturally occurring phoria or misalignment of the eyes of the wearer by shifting the images displayed in the respective left and right displays. For example, instead of an adjustment that removes all vertical alignment error, the adjustment may account for (e.g., add back in) some degree of vertical alignment error to compensate for the naturally occurring phoria or misalignment of the eyes of the wearer (e.g., user).

Figure 9:
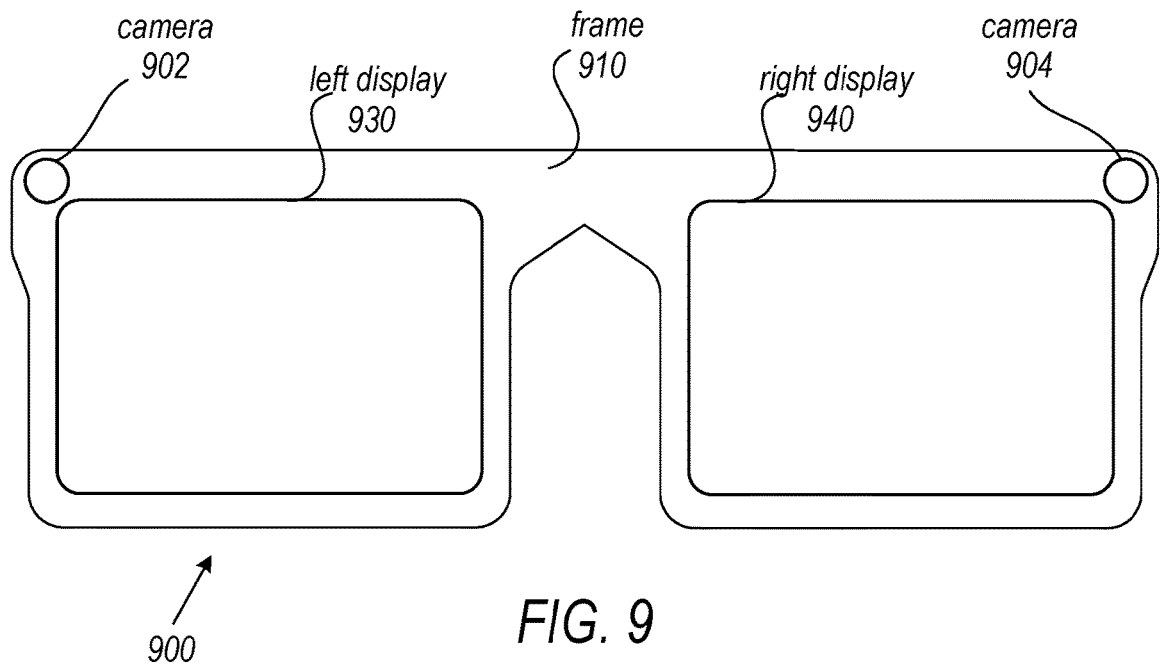
FIG. 9 illustrate an example head mounted displays (HMDs) having binocular displays and multiple cameras that are connected to the HMDs that may be calibrated for vertical alignment error, according to some embodiments.
Figure 10:
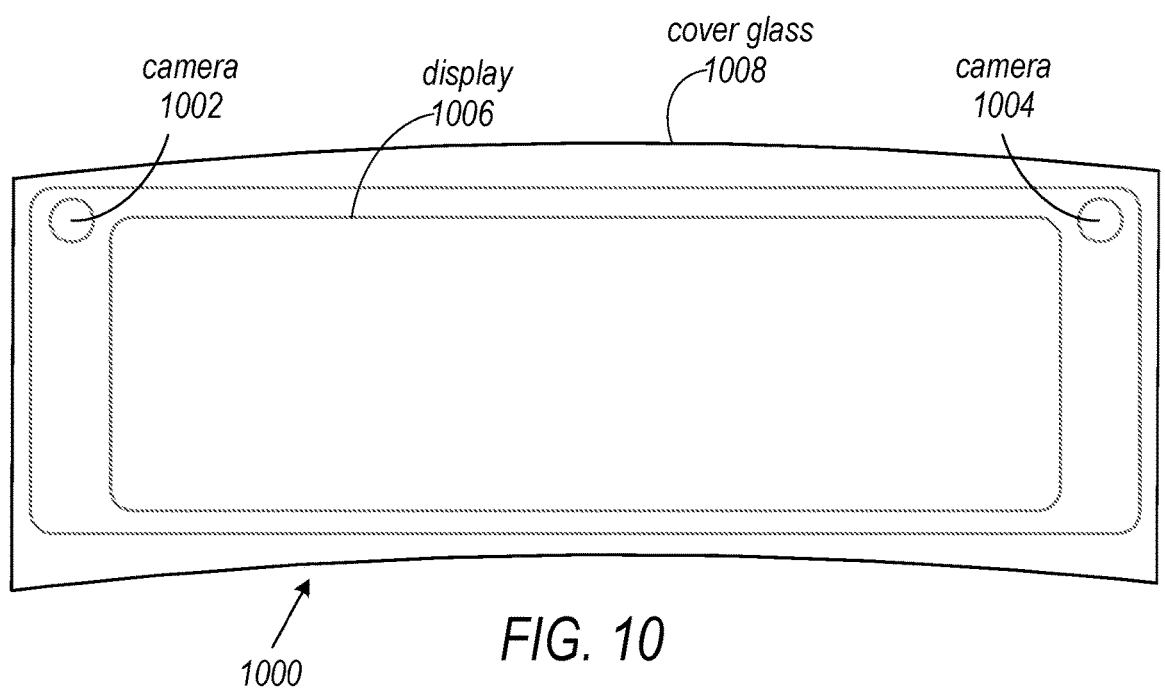
FIG. 10 illustrates an example head-mounted display (HMD) device comprising a frame onto which cameras, a cover glass, and an inertial measurement unit may be mounted, according to some embodiments.

FIG. 9 illustrate an example head mounted displays (HMDs) having binocular displays and multiple cameras that are rigidly connected to the HMDs that may be calibrated for vertical alignment error, according to some embodiments. Note that the HMD unit as illustrated in FIG. 9 is given by way of example and are not intended to be limiting. In various embodiments, the shape, size, and other features of an HMD 900 may differ, and the locations, numbers, types, and other features of the components of the HMD 900 and of the eye imaging system may differ. FIG. 9 depicts a front view of an example HMD. FIG. 9 shows a device that may include left and right displays 930 and 940. In some embodiments, the left and right displays 930 and 940 may be a glasses-like device that has right and left displays or in some embodiments, may contain one lens that covers both eyes with two regions. In some embodiments, an HMD 900 may implement any of various types of display technologies or display systems. In some embodiments, the displays may use Liquid Crystal Displays (LCD), Organic Light-Emitting Diode (OLED), Liquid Crystal on Silicon (LCoS) Microdisplay, etc. In some embodiments, HMD 900 may include a lens-based display system that directs light that forms images (virtual content) through one or more layers of waveguides in the displays and/or may include output couplers of the waveguides such as relief gratings or volume holography that may output the light towards the wearer to form images at or near the wearer's eyes. As another example, HMD 900 may include a direct retinal projector system that directs light towards reflective components of the displays; and the displays may be configured to redirect the light to form images at the wearer's eyes.

HMD 900 may include displays 930 and 930, mounted in a wearable housing or frame 910. HMD 900 may be worn on a user's head (the "wearer") so that the displays are disposed in front of the wearer's eyes. In some embodiments, HMD 900 may also include one or more sensors that collect information about the wearer's environment (video, depth information, lighting information, etc.) and about the wearer (e.g., eye or gaze tracking sensors). The sensors may include one or more of, but are not limited to, one or more eye tracking cameras (e.g., infrared (IR) cameras) that capture views of the user's eyes, one or more world-facing cameras 902 and 904 (e.g., RGB video cameras) that can capture images or video of the real-world environment in a field of view in front of the user, and one or more ambient light sensors that capture lighting information for the environment. Cameras 902 and 904 may be integrated in or attached to the frame 910 of the HMD and may be part of a respective HMD segments that groups respective ones of the cameras 902 and 904 and displays 930 and 940 together. In some embodiments, HMD 900 may also include one or more light sources such as LED point light sources that emit light (e.g., light in the IR portion of the spectrum) towards the user's eye or eyes. In some embodiments, one or more of the displays 930 and 940 and/or cameras 902 and 904 may be calibrated as described in FIGS. 1-8.

In some embodiments, methods and techniques for determining and/or correcting for vertical alignment error may be implemented for cameras of devices 900 and 1000, which may resemble extended reality (XR) glasses, goggles, and/or other head-mounted display device designs. Device 1000 may have a display for displaying in front of both eyes of the user, such as display 1006, in embodiments in which device 1000 has a goggles-like device frame. Alternatively, device 900 may have respective displays 930 and 940 for each eye in embodiments in which device 900 has a glasses-like device frame 910. Devices 900 and 1000 may be worn on a user's head such that the display(s) are placed in front of the user's eyes and may implement any of various types of display technologies or display systems in order to display images, video, or other content to the user of the device using said displays and/or lenses. In addition, device 1000 may have a cover glass, such as cover glass 1008, that may be placed in front of at least cameras 1002 and 1004. Cameras 902 and 904 may be mounted onto locally rigid components of frame 910, and there may be other non-rigid components of frame 910 that may deform, such as a flexible nose-piece of frame 910. Similarly, device 1000 may be attached to a user's head using an elastic band, while cameras 1002 and 1004 may be assumed to be mounted to locally rigid components of the goggles-like device frame of device 1000.

Figure 11:
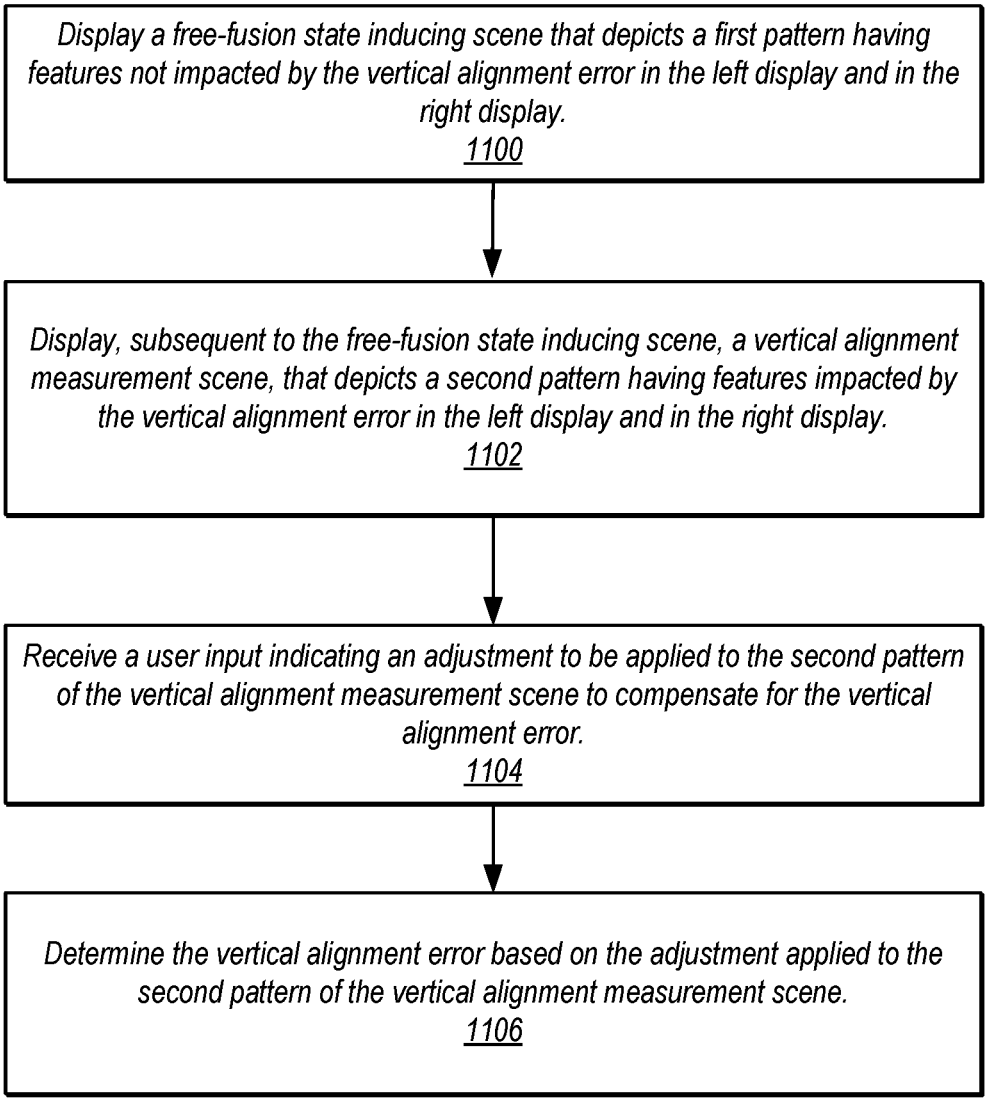
FIG. 11 is a flowchart of a method for determining vertical alignment error of an example system of binocular displays that depicts a vertical alignment error state inducing scene with a binocular stimuli and a vertical alignment error measurement scene, according to some embodiments.

FIG. 11 is a flowchart of a method for determining vertical alignment error of an example system of binocular displays that depicts a vertical alignment error state inducing scene with a binocular stimuli and a vertical alignment error measurement scene, according to some embodiments.

At block 1100, a free-fusion state inducing scene that depicts a first pattern having features not impacted by vertical alignment error is displayed in the left display and in the right display. In some embodiments, the free-fusion state inducing scene comprises patterns such as two vertical lines that are not affected by vertical alignment error as discussed in FIG. 2A. In some embodiments, the free-fusion inducing scene may be displayed using an external display that is polarized in differing manners on the left portion and the right portion as discussed in FIGS. 2-3 and FIG. 5.

At block 1102, subsequent to the free-fusion state inducing scene, a vertical alignment error measurement scene, that depicts a second pattern having features impacted by vertical alignment error is displayed in the left display and in the right display. As discussed in FIG. 2B, the vertical alignment error measurement scene may include patterns that have features impacted by vertical alignment errors such as a horizontal line.

At block 1104, a user input indicating an adjustment to be applied to the second pattern of the vertical alignment error measurement scene to compensate for the vertical alignment error may be received. For example, based on the user input adjustment to be applied, the left pattern may be shifted up and the right pattern be shifted down until the two lines are aligned, or vice versa.

At block 1106, vertical alignment error may be determined based on the adjustment applied to the second pattern of the vertical alignment error measurement scene. As discussed in FIG. 3A, measuring the vertical alignment error, and applying the adjustment factor may be performed until a measured level of vertical alignment error is less than a threshold level of vertical alignment error.

FIG. 12 is a flowchart of a method for determining fixation disparity of an example system of binocular displays to reduce the vertical alignment error, according to some embodiments.

At block 1202, the vertical alignment error measurement scene is displayed in an external display at a fixed distance away from a user of the device, wherein the vertical alignment error measurement scene depicts a first time-based feature that is able to be observed by the left eye of the user and is filtered out by a right image filter at a first moment in time. In some embodiments, the vertical alignment error measurement scene may be displayed using an external display that is polarized in differing manners based on time as discussed in FIGS. 8A-8B.

At block 1204, at a second moment in time, subsequent to the first moment in time, the vertical alignment error measurement scene displayed in the external display comprises a second time-based feature that is able to be observed by the right eye of the user and is filtered out by a left image filter at the second moment in time. In some embodiments, the vertical alignment error measurement scene may be displayed using an external display that is polarized in differing manners based on time as discussed in FIGS. 8A-8B.

At block 1206, another user input indicating another adjustment to be applied to one or more of the first time-based feature or the second time-based feature is received to compensate for the vertical alignment error. As discussed in FIG. 8B, the user input may directly shift the pattern of the external display based on the user input.

At block 1208, fixation disparity of the user based on the other adjustment applied to the vertical alignment error based on the adjustment applied to the one or more of the first time-based feature or the second time-based feature is determined. For example, as discussed in FIG. 8B, the fixation disparity may be determined using the distance between the device and the external display.

At block 1210, based on the determined vertical alignment error and the fixation disparity, the scene as displayed in one or both of the left display and the right display is shifted to reduce the vertical alignment error. In some embodiments, the fixation disparity may shift the vertical alignment error measurement scene as displayed in the external display to shift the images displayed in the left and right displays. In other embodiments, the displays may shift the images from their respective left and right cameras.

Figure 13:
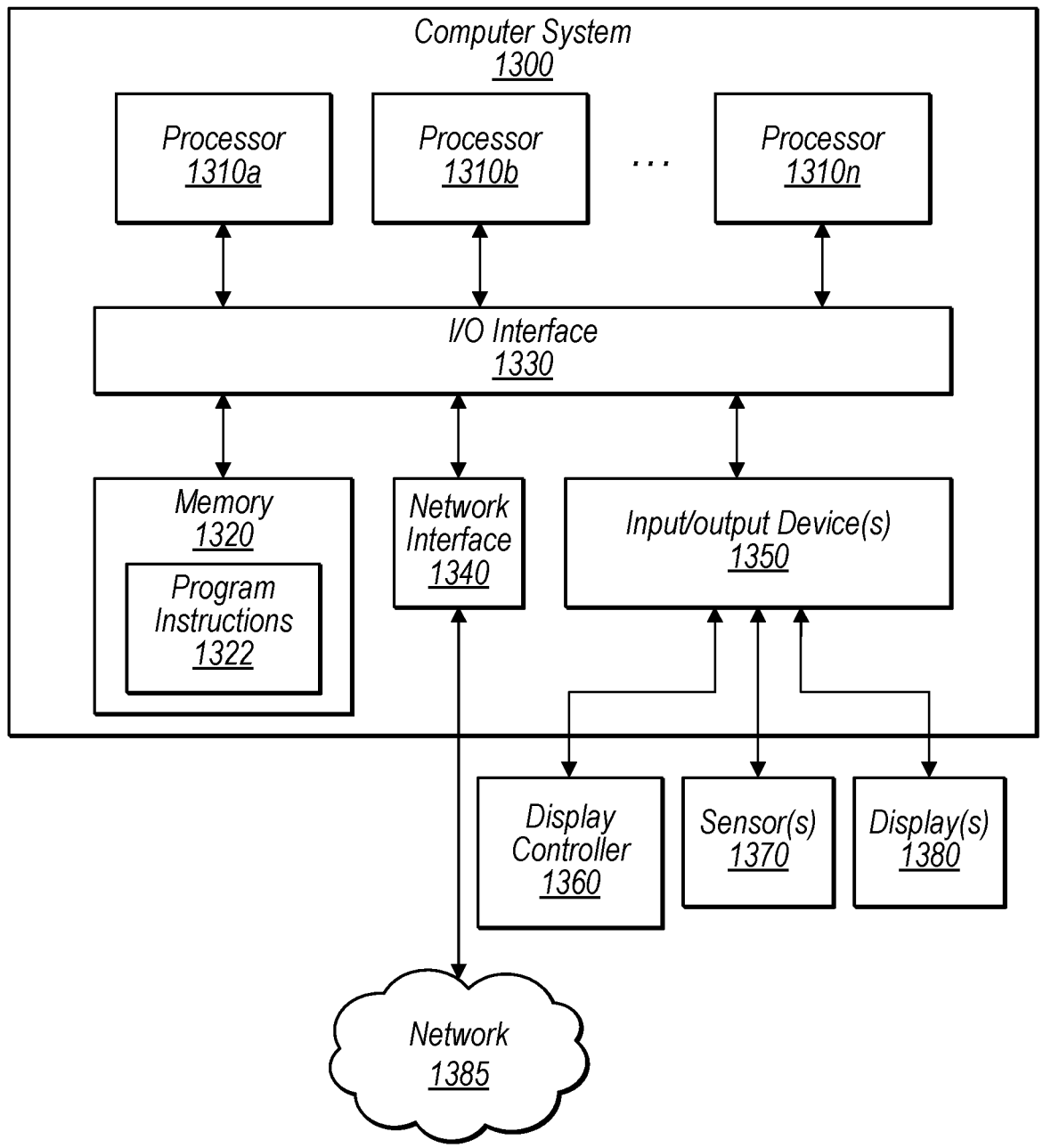
FIG. 13 illustrates an example computer system that may implement a binocular display system and calibration method as described herein, according to some embodiments.

FIG. 13 illustrates an example computer system that may implement a binocular display system and calibration method as described herein, according to some embodiments. In different embodiments, computer system 1300 may be any of various types of devices, including, but not limited to, a personal computer system, desktop computer, laptop, notebook, tablet, slate, pad, or netbook computer, handheld computer, workstation, network computer, a camera, a mobile device, a consumer device, video game console, handheld video game device, application server, storage device, a television, a video recording device, a peripheral device, or in general any type of computing or electronic device.

Various embodiments of program instructions for calibrating the binocular displays and correcting vertical alignment error, as described herein, may be executed in one or more computer systems 1300. Note that any component, action, or functionality described above with respect to FIGS. 1-12 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as display controllers 1360, sensors 1370 (which may include cameras), display(s) 1380 as described in FIGS. 1-12 that may in some embodiments, be used to control the computer system 1300 wirelessly. In some cases, it is contemplated that embodiments may be implemented using a single instance of computer system 1300, while in other embodiments multiple such computer systems, or multiple nodes making up computer system 1300, may be configured to host different portions or instances or program instructions for calibrating binocular displays and correcting vertical alignment error as described above for various embodiments. For example, in one embodiment some elements of the program instructions may be implemented via one or more nodes of computer system 1300 that are distinct from those nodes implementing other elements.

In some embodiments, computer system 1300 may be implemented as a system on a chip (SoC). For example, in some embodiments, processors 1310, memory 1320, I/O interface 1330 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1320 may be configured to store calibration instructions 1322 and/or sensor data accessible by processor 1310. In various embodiments, system memory 1320 may be implemented using any suitable memory technology, such as SRAM, SDRAM, nonvolatile/Flash-type memory, or any other type of memory. In the illustrated embodiment, program instructions 1322 may be configured to implement any of the functionality described above. In some embodiments, program instructions and/or data may be received, sent, or stored upon different types of computer-accessible media or on similar media separate from system memory 1320 or computer system 1300.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing, or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, IMUS, sensors (e.g., cameras, LiDar, etc.), or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included.

Computer system 1300 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

Virtual Reality

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing an HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

Augmented Reality and Mixed Reality

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed using one or more processors, cause the one or more processors to:
   measure splay error for a left display of a device and a right display of the device, wherein to measure the splay error the program instructions cause the one or more processors to:
   receive a user input indicating an adjustment to be applied to a pattern displayed in the left display and the right display to compensate for the splay error; and
   determine the splay error based on the adjustment applied to the pattern.

2. The non-transitory computer-readable medium of claim 1,
   wherein the program instructions, when executed using the one or more processors, further cause the one or more processors to:
   cause a first scene to be displayed, in the left display and in the right display, wherein the first scene depicts a first pattern comprising features not impacted by the splay error;
   wherein the features of the first pattern that are not impacted by the splay error are selected for inclusion in the first pattern based, at least in part, on the features having a property such that:
an amount of vertical offset with regard to a left portion of the features relative to a right portion of the features, is less than a threshold amount when displayed on a binocular display, or sets of displays, exhibiting at least a specified amount of splay error.

3. The non-transitory computer-readable medium of claim 1, wherein the program instructions, when executed using the one or more processors, further cause the one or more processors to:
apply a correction factor to correct for the splay error; and
repeat said determining the splay error and said applying the correction factor until a measured level of splay error is less than a threshold level of splay error.

4. The non-transitory computer-readable medium of claim 1, wherein, the program instructions, when executed using the one or more processors, further cause the one or more processors to:
receive information indicating a distance between the device and an external display,
wherein the external display is configured to display the pattern; and
display in the left display and in the right display images generated at the device based on images displayed on the external display,
wherein the splay error is further determined based, at least in part, on the distance between the device and the external display.

5. The non-transitory computer-readable medium of claim 4, wherein the distance between the device to an external display is determined using one or more of: a light detection and ranging (LiDAR) sensor, a 3D laser scanner, and a digital camera applying photogrammetry.

6. The non-transitory computer-readable medium of claim 1, wherein the program instructions, when executed using the one or more processors, further cause the one or more processors to:
cause a left portion of the pattern to be displayed in the left display that is vertically polarized or horizontally polarized; and
cause a right portion of the pattern to be displayed in the right display that is vertically polarized or horizontally polarized and has a different polarization from the left portion.

7. The non-transitory computer-readable medium of claim 6, wherein the program instructions, when executed using the one or more processors, further cause the one or more processors to:
cause a first scene to be displayed, prior to displaying the pattern, wherein the first scene is forty-five degrees polarized.

8. The non-transitory computer-readable medium of claim 7, wherein the program instructions, when executed using the one or more processors, cause the one or more processors to:
concurrently cause at least a portion of the first scene that is forty-five degrees polarized to be displayed with the pattern, wherein the at least a portion of the first scene is displayed in a center portion of the pattern between the differently polarized left and right portions of the pattern.

9. The non-transitory computer-readable medium of claim 6, wherein the program instructions, when executed using the one or more processors, further cause the one or more processors to cause a first scene and the pattern to be displayed as a combined scene, wherein to display the combined scene the program instructions cause the one or more processors to:
cause to be displayed, in the left display, a left portion of the combined scene that is vertically polarized or horizontally polarized, wherein the combined scene further comprises a left instance of a binocular stimulus in the left portion of the combined scene; and
display, in the right display, the right portion of the combined scene that is vertically polarized or horizontally polarized and has a different polarization from the left portion, wherein the combined scene further comprises a right instance of the binocular stimulus in the right portion of the combined scene,
wherein the left instance and the right instance are able to be binocularly fused.

10. The non-transitory computer-readable medium of claim 1, wherein:
the program instructions, when executed using the one or more processors, cause the one or more processors to cause a first scene to be displayed, wherein causing the first scene to be displayed comprises:
to cause the first scene to be displayed comprises:
cause to be displayed, in the left display, a first interleaved portion of the first scene that is vertically polarized or horizontally polarized,
cause to be displayed, in the right display, a second interleaved portion of the first scene that is vertically polarized or horizontally polarized and has a different polarization from the first interleaved portion of the first scene; and
to cause the pattern to be displayed comprises:
cause to be displayed, in the left display, a first interleaved portion of the pattern that is vertically polarized or horizontally polarized; and
cause to be displayed, in the right display, a second interleaved portion of the pattern that is vertically polarized or horizontally polarized and has a different polarization from the first interleaved portion of the first scene.

11. The non-transitory computer-readable medium of claim 1, wherein to cause the pattern to be displayed comprises:
cause to be displayed, in the left display, at a first moment in time, the pattern, wherein the pattern further comprises a first time-based feature that is not displayed in the right display at the first moment in time; and
cause to be displayed, in the right display, at a second moment in time subsequent to the first moment, the pattern, wherein the pattern further comprises a second time-dependent feature that is not displayed in the left display at the second moment in time.

12. The non-transitory computer-readable medium of claim 1, wherein the device is a head-mounted display, and wherein the left display corresponds to a left eye of a wearer of the head-mounted display and the right display corresponds to a right eye of a wearer of the head-mounted display.

13. The non-transitory computer-readable medium of claim 1, wherein the program instructions, when executed using the one or more processors, further cause the one or more processors to:
shift, based on the received user input, the pattern as displayed in one or both of the left display and the right display to reduce the splay error.

14. The non-transitory computer-readable medium of claim 1, wherein a first pattern displayed comprises one or more vertical lines, and wherein the second pattern comprises one or more horizontal lines.

15. The non-transitory computer-readable medium of claim 1, wherein the program instructions, when executed using the one or more processors, further cause the one or more processors to:
cause the pattern to be displayed in an external display at a fixed distance away from a user of the device, wherein the pattern further comprises a first time-based feature that is able to be observed by the left eye of the user and is filtered out by a right image filter at a first moment in time;
cause to be displayed in the external display, at a second moment in time subsequent to the first moment in time, the pattern, wherein the pattern further comprises a second time-based feature that is able to be observed by the right eye of the user and is filtered out by a left image filter at the second moment in time;
receive another user input indicating another adjustment to be applied to one or more of the first time-based feature or the second time-based feature to compensate for the splay error;
determine fixation disparity of the user based on the other adjustment applied to the pattern based on the other adjustment applied to the one or more of the first time-based feature or the second time-based feature; and
shift, based on the determined splay error and the fixation disparity, the pattern as displayed in one or both of the left display and the right display to reduce the splay error.

16. A method, comprising:
performing a process for measuring a splay error of a scene as displayed in a left display of a device and the scene as displayed in a right display of the device, wherein performing the process comprises:
receiving a user input indicating an adjustment to be applied to a pattern to compensate for the splay error; and
determining splay error based on the adjustment applied to the pattern.

17. The method of claim 16, wherein the method further comprises:
displaying the pattern in an external display at a fixed distance away from a user of the device, wherein the pattern further comprises a first time-based feature that is able to be observed by the left eye of the user and is filtered out by a right image filter at a first moment in time;
displaying, at a second moment in time subsequent to the first moment in time, the pattern in the external display, wherein the pattern further comprises a second time-based feature that is able to be observed by the right eye of the user and is filtered out by a left image filter at the second moment in time;
receiving another user input indicating another adjustment to be applied to one or more of the first time-based feature or the second time-based feature to compensate for the splay error;
determining fixation disparity of the user based on the other adjustment applied to the pattern based on the adjustment applied to the one or more of the first time-based feature or the second time-based feature; and
shifting, based on the determined splay error and the fixation disparity, the pattern as displayed in one or both of the left display and the right display to reduce the spaly error.

18. The method of claim 16, wherein the method further comprises:
causing to be displayed, in the left display at a first moment in time, the pattern wherein the pattern further comprises a first time-based feature that is not displayed in the right display at the first moment in time; and
causing to be displayed, in the right display at a second moment in time subsequent to the first moment, the pattern wherein the pattern further comprises a second time-dependent feature that is not displayed in the left display at the second moment in time.

19. A device, comprising:
a left display that corresponds to a left eye of a user of the device;
a right display that corresponds to a right eye of the user;
an input device;
one or more processors; and
a memory, storing program instructions that when executed by the one or more processors, cause the one or more processors to:
perform a process for measuring a splay error of a scene as displayed in the left display and the scene as displayed in the right display, wherein to perform the process comprises:
receiving, via the input device, an input from the user indicating an adjustment to be applied to a pattern to compensate for the splay error; and
determining splay error based on the adjustment applied to the pattern.

20. The device of claim 19, wherein to determine the splay error based on the adjustment applied to the pattern comprises:
obtaining a distance between the device and an external display, wherein the external display is configured to depict the scene that is displayed in the left display and the right display; and
determining the splay error based on the adjustment to be applied to the pattern and the distance.

* * * * *